(12) United States Patent
Shaffer et al.

(10) Patent No.: US 12,519,889 B2
(45) Date of Patent: Jan. 6, 2026

(54) PASSIVELY QUALIFYING CONTACTS

(71) Applicant: Journey.ai, Denver, CO (US)

(72) Inventors: Shmuel Shaffer, Palo Alto, CA (US); Brett Shockley, Bonita Springs, FL (US)

(73) Assignee: Journey.ai, Denver, CO (US)

( * ) Notice: Subject to any disclaimer, the term of this patent is extended or adjusted under 35 U.S.C. 154(b) by 473 days.

(21) Appl. No.: 17/968,764

(22) Filed: Oct. 18, 2022

(65) Prior Publication Data

US 2023/0120358 A1 Apr. 20, 2023

Related U.S. Application Data

(60) Provisional application No. 63/256,783, filed on Oct. 18, 2021.

(51) Int. Cl.
*H04M 3/523* (2006.01)
*G06F 16/65* (2019.01)

(52) U.S. Cl.
CPC .......... *H04M 3/5233* (2013.01); *G06F 16/65* (2019.01)

(58) Field of Classification Search
None
See application file for complete search history.

(56) References Cited

U.S. PATENT DOCUMENTS

| 10,616,411 | B1 * | 4/2020 | Chang | H04M 3/2281 |
| 11,632,459 | B2 * | 4/2023 | Chawla | H04L 63/0245 |
| | | | | 379/35 |
| 2012/0072453 | A1 * | 3/2012 | Guerra | H04L 9/32 |
| | | | | 707/E17.014 |
| 2021/0358503 | A1 * | 11/2021 | Keret | G10L 17/06 |
| 2022/0070292 | A1 * | 3/2022 | Casal | H04M 3/2281 |

* cited by examiner

*Primary Examiner* — Hemant S Patel
(74) *Attorney, Agent, or Firm* — Lee & Hayes, P.C.

(57) ABSTRACT

The techniques herein are directed generally to methods and apparatus for automatically classifying interactions with contact center, identifying contacts as being initiated by one of a normal user, a malicious actor, an inexperienced user, or a new type of a user, and invoking mitigation actions such as forwarding the caller to a dedicated agent group based on the identification.

20 Claims, 12 Drawing Sheets

600 

| Index | Message / Event | Comment |
|---|---|---|
| 1 | ENT_ID_Req | Request user to enter ID |
| 2 | ENT_ID_Rep | User entered ID |
| 3 | T_ID REQ | Time between requesting user ID and user reply |
| 4 | ID_Val_INPUT | Indicative whether the input was valid |
| 5 | ENT_Pass_Req | Request user to enter Password |
| 6 | ENT_Pass_Rep | User entered Password |
| 7 | T_Pass REQ | Time between requesting user password and user reply |
| 8 | Bal_Inf_ Req | Request for information about balance |
| 9 | Hist_Bal_ Inf_ Req | Request for historical information about balance |
| 10 | Transl_Inf_ Req | Request for information about a transaction |
| 11 | Hist_Trans_ Inf_ Req | Request for historical information about transactions |
| 12 | Amount | Volume of requested transaction |
| 13 | Amount Ratio | Ratio between requested transaction and historical transaction |
| 14 | Trans_Dest | Destination accout to which funds should be transferred |
| 15 | New_Dest | Indicative whether dstination was previously used |

FIGURE 6A

PASSIVELY QUALIFYING CONTACTS

RELATED APPLICATION

This application claims priority to U.S. Prov. Appl. Ser. No. 63/256,783, filed on Oct. 18, 2021, by Shmuel Shaffer, et al., entitled PASSIVELY QUALIFYING CONTACTS, the contents of which are incorporated herein by reference.

TECHNICAL FIELD

The present disclosure relates generally to contact center interactions and, more particularly, to passively qualifying contacts, such as for a contact center.

BACKGROUND

A contact center is an entity (centralized or distributed, despite the term "center") used for receiving or transmitting a large volume of enquiries by telephone, video, online audio, or other real-time contact methodology or live support software. Contact centers may either be outbound, inbound, or both, where outbound contact centers are typically operated for outgoing contact (e.g., telemarketing, solicitations, debt collection, market research, fraud alerts, and so on), and inbound contact centers are typically operated for incoming services (e.g., incoming product or service support or information enquiries from consumers). Banks, for example, may have both inbound and outbound operations, both accepting incoming user requests (e.g., balance information or transfers), and conversely for reaching out to customers with outgoing user requests (e.g., fraud alert confirmation, etc.).

Large contact centers handle many thousands of interactions per day. Most of these interactions are initiated by honest people who use the contact center to conduct their business. However, a few of the interactions are initiated by bad actors with the intent to illegally acquire information or other assets such as money from the enterprise that runs the contact center.

Banks and other enterprises lose millions of dollars either directly to bad actors or because of loss of customers' trust due to digital identity fraud and/or phone fraud. To combat and reduce a potential loss, companies train their agents and or devices and configure their systems to address such threats. For example, companies rely on technology to assess the identity of the calling number and or the identity of the calling device and tailor the provided service based on the results of the assessment.

For example, companies like Neustar (of Reston, Virginia) establish a "TrustID" of the initiating device based on the reputation of the contacting device, network signals, behavior, and call statistics. The reputation of the contacting device can be derived from an internal database of fraudulent numbers and previous mobile ads and purchase history. The network signals may be obtained from carrier, Wi-Fi, and geolocation information as well as from data obtained from automated dialers. The behavior information may be obtained from a long list of account number testing, a long list of social security number testing, and the call statistics may be derived from information such as repeated calls from same Automatic Number Identification (ANI), hang-ups when customer service representative answers, and based on call arrival time intervals.

TrustID may establish an overall identity risk score based on a device score, and an IP score, and flag a contact as being a fraud suspect if the phone was recently ported, the billing address for the phone does not match the address of a payment card, the IP of the originating contact being involved with previous fraudulent contact, history of suspicious traffic visitation patterns (fraudsters browsing behavior differs considerably from that of an ordinary Internet user), identifying the initiating device as a burner phone, and so on.

The specifics of determining the risk introduced by each one of the above mentioned dimensions are managed by a set of heuristics established based on experience of the specific establishment. Similarly, aggregation of the different factor to establish a cohesive an overall identity risk is a major challenge.

To reduce the risk, companies spend substantial resources on mitigating the issue. This includes agent training, and cumbersome processes that while reducing the rate of fraud, adversely impact contact center productivity as well as customer satisfaction.

In addition to the direct cost inflicted by direct identity fraud and contact fraud, the risk of being impacted by these illegal activities may prevent companies from introducing new products that may increase the risk of fraudulent activities.

SUMMARY

The techniques herein are directed generally to passively qualifying contacts for a contact center. In particular, according to one or more embodiments described herein, methods and/or apparatus are shown for detecting/classifying some interactions as potentially fraudulent and minimizing the damage they may inflict on organizations, while classifying other interactions as less risky and thus providing them with a more expedient treatment.

In particular, methods and apparatus for classifying a contact as being a normal contact, a potential fraudulent contact from a malicious agent, or a contact from a person who requires support, are described herein. Specifically, the method monitors the behavior of a person interaction with a contact processing device, e.g., an Interactive Voice Response (IVR), virtual agent, bot, etc., and based on the observed interaction, the method classifies the contact as being initiated by at least one of fraudulent actor, unexperienced user, and a normal actor. The interactions may include activities in an IVR, text interactions exchanged with a virtual agent, text and voice interactions exchanged with a robotic process automation (RPA) device, interaction with a bot, and or interactions with a live agent. The interaction may include voice and/or text interactions, as well as video interactions.

In various embodiments during use, information exchange including interaction sequences between individual user (via a terminal) and at least one of automated contact handling and a live agent are analyzed to determine if they correspond to predetermined clusters of interaction sequences, with the interaction sequences being represented by interaction sequence vectors, known to correspond to a particular interactions problem and/or mitigation action. If a detected interaction sequence is determined to correspond to a cluster of interactions associated with not-normal service request, e.g., fraudulent contact or a contact from a novice user who needs help, a corresponding tagging of the contact takes place and a mitigation action is automatically taken by the method.

The automated mitigation actions includes, but is not limited to, directing the contact to a person who is trained to handle and deflect fraudulent contact, disconnecting the contact, and transferring contact to a person who could provide immediate help and expedite the activities that the inexperienced person attempts to perform. Additionally, when the contact is tagged as non-fraudulent, the method may expedite the service provided to the contact by directing the contact to the appropriate resources.

In addition, reports about exchange sequences determined to correspond to fraudulent service requests, as well as to service requests from inexperienced users, are generated and provided to a contact center administrator along with information on the action which was taken to mitigate the problem, e.g., to mitigate a risk introduced by contacts that were tagged as potentially fraudulent, or by contacts that were tagged as being introduced by inexperienced actors.

By monitoring individual interaction sequences between customers and contact centers, identifying individual interaction sequences corresponding to interaction sequence clusters known to correspond to fraudulent activities or to activities of inexperienced users, many problems can be identified and corresponding mitigation actions can be, and sometimes are, taken, e.g., in real time while an interaction session is still ongoing, without the need for an agent or a technician to communicate or report a problem. In fact, in many circumstances, issues can be corrected before bad actors manage to infiltrate the system and cause damage, or before an inexperienced user disconnects, e.g., hangs up, because of being intimidated by the system. For example, a mishandling of a contact may not result in compromising resources of an enterprise but may still result in a fraudulent service request or a service request by an inexperienced user for the inexperienced user or mishandling of a non-fraudulent call if the contact is not tagged corrected.

Thus, at least in some embodiments by monitoring an interaction sequence between a user and at least one of contact-processing device and a contact center agent, matching the interaction sequence to an interaction sequence cluster known to correspond to fraudulent interaction, or interaction originating from an inexperienced user, and having a corresponding known handling actions associated with the interaction sequence cluster to which the detected sequence is matched, a mitigation action to be taken can be determined and implemented to avoid or ameliorate fraudulent service request or a service request by an inexperienced user in real time. This can be, and in some embodiments is, done for multiple interaction sequences between different users and different manual and/or automated contact handling devices, e.g., IVRs, Bots, APRs, etc., while one or more interaction sessions or attempts to establish interaction sessions are ongoing.

While many features relate to the detection of interaction sequences corresponding to a cluster of interactions associated with fraudulent service requests or requests from inexperienced users and taking a mitigating action, various features relate to a training phase which may be implemented once before mapping interaction sequences to interaction sequence clusters is performed, e.g., in real time, for mitigation action purposes.

Various features relate to the use of machine learning, e.g., during a training phase, in which interaction sequences are arranged into clusters and models of the clusters are generated sometimes in the form of interaction sequence vector values and/or value ranges which can be used to determine if an interaction sequence being monitored corresponds to an interaction sequence cluster, e.g., known to be associated with fraudulent service request or a request from an inexperienced user and for which a mitigation and or mitigation action to be taken is also associated.

In various embodiments sequences of interactions between users and one or more contact centers are monitored. Interactions between different users and contact centers are treated as different interaction sequences. Thus interaction sequences may be distinguished based on the user involved with the interactions, e.g., the user trying to set up the call center interactions. Interaction sequences in some, but not necessarily all embodiments, start with the same exchange. In some embodiments, the end of a successful interaction sequence is detected by a user successfully completing an action, or by an agent marking the interaction as completed, indicative of the end of the interaction sequence. In some embodiments, detection of the start of a new interaction sequence is based on an event indicating the start of an interaction sequence, without detecting successful completion of the previous interaction sequence involving the same user i.e., the new interaction sequence is interpreted as the previous interaction sequence between said user and contact centers having terminated without success, e.g., an interaction sequence failure such as a disconnect. It should be appreciated that once a user starts an interaction sequence, the interaction sequence may continue with interactions being sent to one or more contact center's devices prior to the individual user starting a new interaction sequence. The detected interaction sequences are stored. The stored interaction sequences are then labeled, e.g., by a human or via a machine, as corresponding to a good interactions service or poor communication service such as fraudulent session. Failure for the interaction sequence to properly terminate, the repeating of interactions in the interaction sequence or other service criteria can, and sometimes are, used for automatically determining if a detected interaction sequence to be used for training purposes corresponds to normal or fraudulent service request or a request from an inexperienced user. With the set of training sequences having been labeled, the interaction sequences are processed first, e.g., for each interaction sequence being used for the training purpose, a corresponding interaction sequence vector is generated. Generation of interaction sequence vectors may be sequential, first generating an interaction vector for the first interaction in the sequence and then updating the overall interaction sequence vector by adding new interactions in the sequence in a given sequence. Interaction vectors may be based on features such as how often the particular interaction occurs in training set of vectors, the average relative spacing of a particular interaction from another interaction, the probability that an interaction occurs at a particular position in interaction sequences or any of another number of factors. In some embodiments each interaction vector is an N dimensional vector, i.e., a vector ($e\_1, e\_2, \ldots, e\_N$) with N elements where each element in the vector is a numerical value. Thus, in the case where N is three, an interaction vector would include 3 elements. Larger vectors are often used with the number of elements, N, in a vector ranging between 10 and 20 in some embodiments but larger numbers of elements are also possible.

An interaction sequence vector is generated from the vectors corresponding to interactions in a sequence. For example a sequence of 5 interactions may have the interaction vectors of the 5 interactions processed and combined to generate an interaction vector sequence for the sequence of 5 interactions. The interaction sequence vectors may, and in some embodiments do, include the same number of elements as the individual interaction vector. Thus, an interaction sequence vector generated from a sequence of 5 interactions and corresponding interaction vectors having N elements each would, in some embodiments result in an interaction sequence vector also having N elements. For example, if a 5 interaction sequence was processed and the interaction vectors corresponding to the detected interaction sequence each had 20 elements, the interaction sequence vector would also have 20 elements, e.g., values, in some embodiments. In other words, the dimension of an interaction sequence vector may be and often is the same as the dimension of the interaction vectors that are used to generate the interaction sequence vector.

With interaction sequence vectors having been generated for the training interaction sequences, and the sequences having been labeled as corresponding to a normal service request, fraudulent service request, or a service request from an inexperienced user, the interaction sequence vectors are processed to put them in clusters, e.g., clusters corresponding to normal, fraudulent, or a request from an inexperienced user.

In some embodiments interactions sequences indicative of inexperienced users are grouped into clusters based on the different areas of expertise required to service the user. Machine learning techniques can be used to cluster the normal interaction sequences and interaction sequences indicative of a need for a special treatment.

In accordance with some embodiments a cluster definition defines a volume occupied by the cluster in the N dimensional space. In some embodiments the cluster definition includes an N dimensional vector indicating the centroid (center point) of the cluster and a separate value for each of the N dimensions indicating how far the volume extends in a given dimension from the specified centroid. In some such embodiments if a vector is within the volume which defines a cluster it is considered to correspond to the cluster.

Clusters of interaction sequences which have been identified and defined during training, are labeled as part of the training process, e.g., by a contact center or training administrator as corresponding to normal, fraudulent, or interactions of inexperienced users. In the case of an interaction sequence cluster corresponding to, a mitigation action to be taken is associated with the cluster. The mitigation action associated with an interaction sequence cluster known to correspond to fraudulent service request or a service request by an inexperienced user will depend on the events leading to the fraudulent service request or a service request by an inexperienced user for a given interaction sequence cluster. The labeling of good/bad interaction sequences can be skipped in some embodiments where the interaction clusters being labeled as corresponding to good or fraudulent service request or a service request by an inexperienced user after the detected interaction sequences are grouped into clusters. (In some embodiments, rather than classifying a contact as good or bad (fraudulent), multiple other classes can be identified like inexperienced customers, etc.—that is, although the discussion herein mentions a binary classification of good/bad, those skilled in the art should recognize that more than two categories (multi-category classification) are also covered by the embodiments herein.)

Thus, during the training phase which precedes the real time use phase, interaction sequence clusters are defined, labeled as corresponding to, e.g., a good or fraudulent service request or a service request by an inexperienced user and for some or all of the individual interaction sequence clusters identified as corresponding to fraudulent service request or a service request by an inexperienced user, a corresponding mitigation action is associated and stored.

Once the initial training is complete, interactions between users and contact centers are monitored, an interaction sequence vector is generated for each detected interaction sequence and updated once a new interaction is observed, and the interaction sequence vector is compared to predetermined interaction sequence cluster definitions. If an interaction sequence is determined to correspond to a cluster associated with fraudulent service request or a service request by an inexperienced user, a notification and or report is generated and provided to a contact center administrator, device, or system and, when a mitigation action is associated with the interaction sequence cluster to which the interaction sequence had been determined to correspond, the mitigation action is automatically implemented, e.g., transfer of a "good" contact to an agent from first group of agents to expedite service, transfer of an inexperienced customer to an agent from a second group of agents specializing in guiding novice customers, transfer of suspected fraudulent contact to agent group specializing in fraud handling, etc.

Interaction sequences encountered during use of the system can include previously unknown interaction sequences and still match to an interaction sequence cluster since the definition of interaction sequences corresponding to the cluster include a set of vector elements with ranges. A interaction sequence having a set of vector elements which fall within the set of vector value ranges used to define an interaction cluster with fraudulent service request or a service request by an inexperienced user will be determined to match the interaction cluster even though the exact set of interactions in the detected interaction sequence may not have been in the set of training data used to generate the interaction clusters and corresponding definitions. In this way, interaction sequences can be matched to a fraudulent service request or a service request by an inexperienced user condition and mitigation action taken even if the exact interaction sequence was not part of the interaction sequence training data set.

Detection of new interactions may, and sometimes does, initiate a retraining operation. Thus in at least some embodiments over time as the set of observed interactions and interaction sequences increases the definitions of interaction clusters can be further refined.

The methods and apparatus are not limited to particular machine learning and clustering techniques and a wide variety of techniques can be used to generate the interaction cluster definitions which can be associated with mitigation actions in accordance with the techniques herein.

An example method of operating an apparatus in accordance with some embodiments, comprises: storing in a storage device interaction sequence vector to interaction sequence vector cluster mapping information for a plurality of interaction sequence clusters mitigation associated with fraudulent service request or a request for service by an inexperienced user; storing for at least some individual interaction sequence clusters, in said plurality of interaction sequence clusters mitigation associated with fraudulent service request or a request for service by an inexperienced user, a corresponding mitigation action; detecting an interaction of a first ongoing interaction sequence involving a first user and at least one contact center device; updating a first interaction sequence vector based on at least the detected interaction of the first ongoing interaction sequence; determining if the first ongoing interaction sequence corresponds to one of the plurality of interaction sequence clusters mitigation associated with fraudulent service request or a request for service by an inexperienced user; and in response to determining that the first ongoing interaction sequence corresponds to one of the plurality of interaction sequence clusters mitigation associated with fraudulent service request or a request for service by an inexperienced user, performing the mitigation action corresponding to the one of the plurality of interaction sequence clusters to which the first ongoing interaction sequence is determined to correspond.

An example apparatus, in accordance with some embodiments, comprises: a processor configured to: store in a storage device interaction sequence vector to interaction sequence vector cluster mapping information for a plurality of interaction sequence clusters mitigation associated with fraudulent service request or a request for service by an inexperienced user; store for at least some individual interaction sequence clusters, in said plurality of interaction sequence clusters mitigation associated with fraudulent service request or a request for service by an inexperienced user, a corresponding mitigation action; detect an interaction of a first ongoing interaction sequence involving a first user and at least one access point; update a first interaction sequence vector based on at least the detected interaction of the first ongoing interaction sequence; determine if the first ongoing interaction sequence corresponds to one of the plurality of interaction sequence clusters mitigation associated with fraudulent service request or a request for service by an inexperienced user; and in response to determining that the first ongoing interaction sequence corresponds to one of the plurality of interaction sequence clusters mitigation associated with fraudulent service request or a request for service by an inexperienced user, perform the mitigation action corresponding the one of the plurality of interaction sequence clusters to which the first ongoing interaction sequence is determined to correspond.

While various embodiments have been discussed in the summary above, it should be appreciated that not necessarily all embodiments include the same features and some of the features described above are not necessary for all embodiments. Numerous additional features, embodiments, and benefits of various embodiments are discussed in the detailed description which follows.

BRIEF DESCRIPTION OF THE DRAWINGS

The embodiments herein may be better understood by referring to the following description in conjunction with the accompanying drawings in which like reference numerals indicate identically or functionally similar elements, of which:

FIG. 6A is an example interaction dictionary in the form of a table listing interactions that may be used between a user and one or more contact centers in the system of FIG. 1;

DESCRIPTION OF EXAMPLE EMBODIMENTS

The techniques herein are generally directed to an automated system that can assess the risk associated with each contact and reliably flag suspicious contacts without requiring cumbersome heuristics rules. Also, given the fact that malicious actors keep changing their behavior, the system herein is configured to automatically adapt and learn new attack vectors and provide mechanisms to mitigate against these attacks with changing characteristics. In another aspect of the embodiments herein, the techniques herein also identify users who are in a need for help and direct them to the proper resources.

Figure 1:
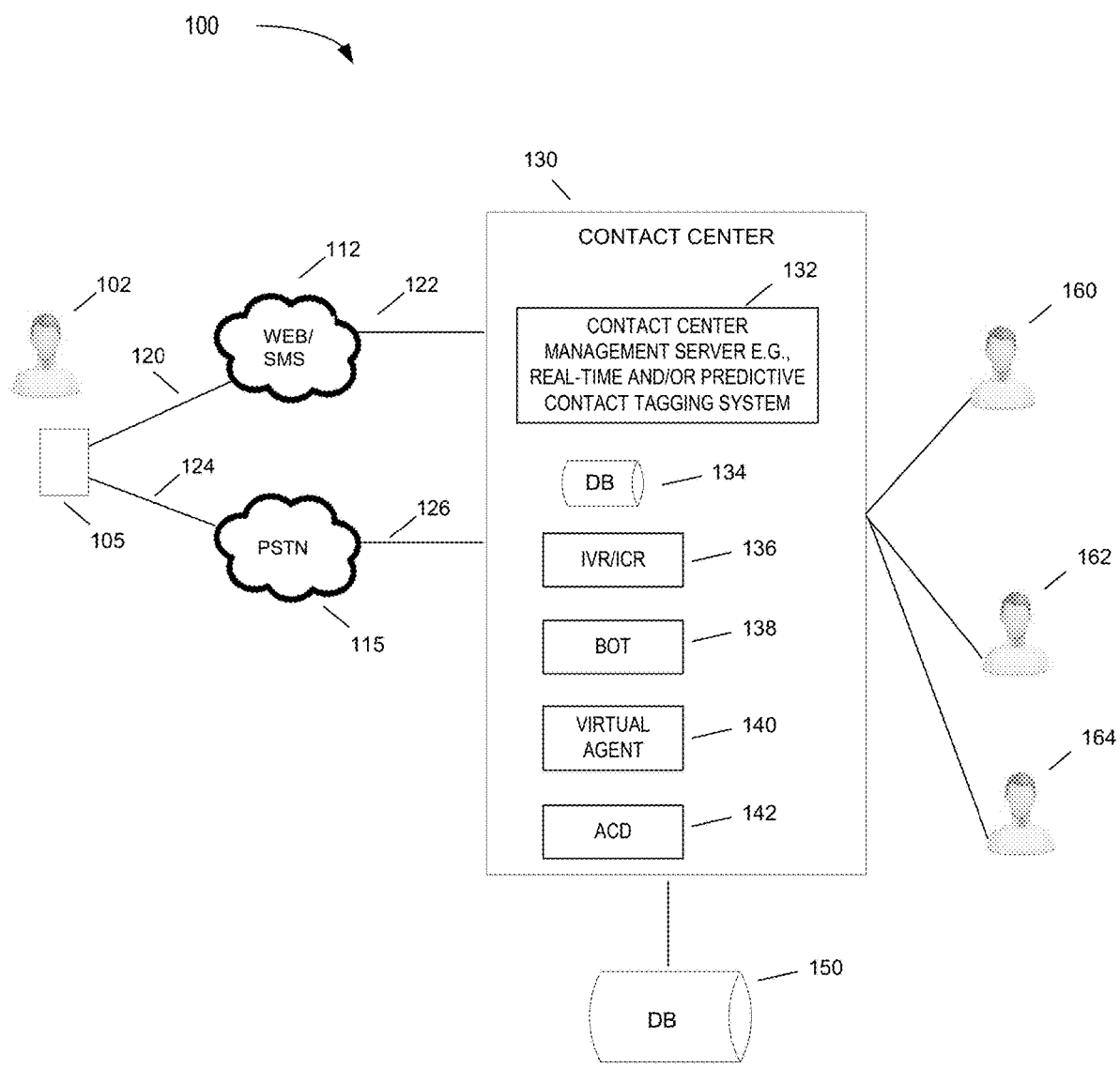
FIG. 1 is a block diagram illustrating an example contact center system in which the embodiments herein may be implemented.

FIG. 1 is a drawing of an example system 100 implemented in accordance with one embodiment. Example system 100 includes a user 102 representing one of a malicious user, unexperienced user, or a normal user.

User 102 uses his user terminal 105 to establish a contact with a contact center 130. The contact may be established over a PSTN network 115, over SMS or a web network 112, or over any other suitable network such as a cellular network, etc. which is omitted from the diagram for sake of simplicity. The contact is established using wired and/or wireless connections 120, 122, 124, and 126. Once the contact is presented to the contact center, the contact center management server 132, as explained in greater details below, the contact center analyzes the behavior of the contact based on a previously established behavior model. In accordance with one example implementation, the contact behavioral model is stored in contact center database 134. The contact center management server monitors the interactions between user 102 and the interactive voice response (IVR)/interactive contact response (ICR) system 136, the Bot 138, the virtual agent 140, as well as other interactions in the system such as interactions with other resources such as database 150 which may contain financial information, information about interactions previous of previous contacts of user 102 as well as other users, etc.

Contact center management server analyzes the behavior of the contact and classifies it accordingly based on the information stored about previous interactions with the contact center. More specifically, the classification may include identifying the contact as a normal/safe contact, a malicious contact, a contact originated by an inexperienced user, contact established by an automated application, etc.

The classification information is provided to automated contact distribution (ACD) server 142 which directs the contact to the appropriate agent group such as groups such as agent groups 160, 162, and 164. For example, agent group 160 may provide expedient service to users who were identified and classified as normal users, agent group 162 may provide assistance and explanations to users who were identified and classified as inexperienced users, and agent group 164 may handle contacts from users who were identified as potentially malicious users. In one specific example implementation, contacts initiated by robots may be disconnected, or according to another example implementation, these contacts may be transferred to special agent group (not shown) which would attempt to determine the origin of these contacts, or extract additional information that could be used to enhance the contact classification model and improve processing of future contacts.

Figure 2:
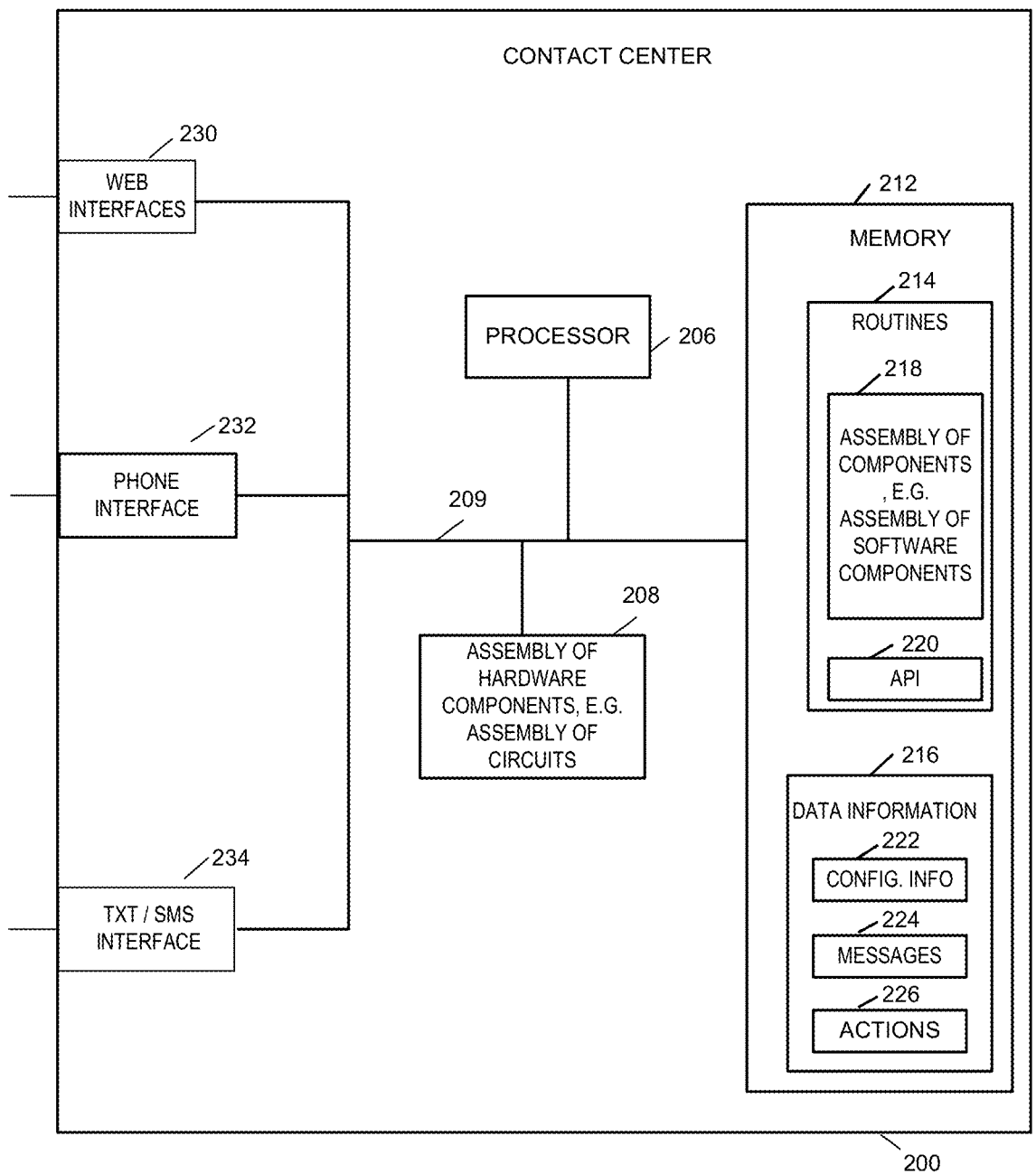
FIG. 2 is a block diagram illustrating an embodiment of an IVR/ICR which can be used in the system shown in FIG. 1.

FIG. 2 is a drawing of an example contact center 200 (e.g., contact center 130 of FIG. 1) in accordance with an example embodiment. Contact center 200 includes web interface 230, phone interfaces 232, and text/SMS interface 234, a processor 206, e.g., a CPU, a memory 212, and an assembly of components 208, e.g., assembly of hardware components, e.g., assembly of circuits, coupled together via a bus 209 over which the various elements may interchange data and information. Web interface 230 couples the contact center 200 to an internet network and/or the Internet 112 of FIG. 1. Phone interface 232, e.g., a phone trunk interface, e.g. T1, E1, ISDN, PRI, SIP, etc., facilitates connectivity of users to the contact center over dial up and video connections. SMS and/or text interface 234 facilitates connectivity of users to the contact center using text messages such as SMS, etc.

Memory 212 includes routines 214 and data/information 216. Routines 214 include assembly of components 218, e.g., an assembly of software components, and Application Programming Interface (API) 220. Data/information 216 includes configuration information 222, messages indicative of the behavior of the contact 224 and collection of mitigation actions 226 to be taken base on the classification of the behavior of a contact.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Figure 3:
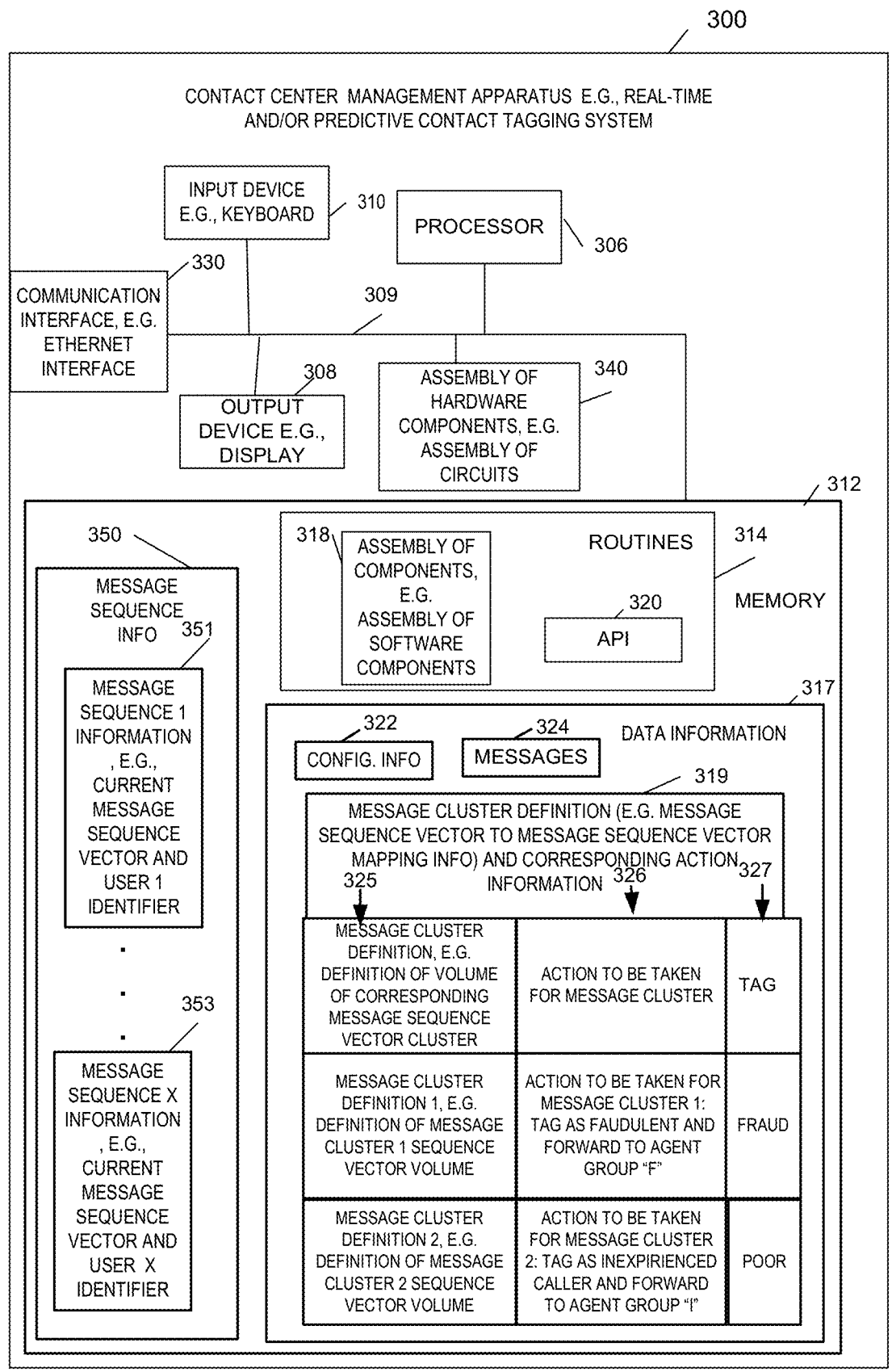
FIG. 3 is a block diagram illustrating an embodiment of contact center management apparatus, e.g., real-time and/or predictive contact tagging detection and mitigation device that can be implemented as a standalone contact center device, e.g., server or incorporated into another network device, e.g., any server of FIG. 1.

FIG. 3 is a drawing of an example of contact center management apparatus 300, e.g., a real-time and/or predictive contact behavior classification node, in accordance with an example embodiment. In some embodiments, the contact center management apparatus 300 is a contact center management node, e.g., a contact center management server such as contact center management real-time and/or predictive contact behavior classification and mitigation server. In some embodiments, contact center management apparatus 300 of FIG. 3 is contact center management system (CCMS) 130 of FIG. 1. In some embodiments the contact center management apparatus 300 is or is part of another server (not shown).

Contact center management apparatus 300 includes an communication interface 330, a processor 306, an output device 308, e.g., display, printer, etc., an input device 310, e.g., keyboard, keypad, touch screen, mouse, etc., a memory 312 and an assembly of components 340, e.g., assembly of hardware components, e.g., assembly of circuits, coupled together via a bus 309 over which the various elements may exchange data and information. The communication interface 330 includes one or more of an Ethernet interface, telephony interface, SMS/text interface and other interfaces used for exchange of information. Communication interface 330 couples the contact center management system 300 to a network and/or the Internet. In some example embodiments, interactions interface 330 facilitates monitoring of data and information, e.g., including contact related information, e.g., interaction states, information related to time spent in each state, and success/failure related information from authentication services, flow of data to and from database such as DB 150 of FIG. 1, SMS and text messages, information lookups, transaction requests, and other related messages and events reflective of the behavior of the contact. The communication interface is also used for sending data and information, e.g., including configuration information and instructions, e.g., instructions to distribute or redirect a contact to one of the agents pools such as agent pools 160, 162, and 164 of FIG. 1.

Memory 312 includes routines 314 and data/information 317. Routines 314 include assembly of components 318, e.g., an assembly of software components, and an Application Programming Interface (API) 320. Data/information 317 includes configuration information 322, captured messages e.g., interaction event stream 324 including interactions and/or interaction fields as well as source and destination information, e.g., the user/contact ID associated with the interaction. The memory 312 also includes interaction cluster related information 319 including interaction cluster definition information 325, action to be taken information 326, such as contact classification and contact distribution instruction, and a tagging field 327 for the corresponding cluster. In information 319 the first row provides a heading while each additional row provides information for one interaction cluster. For example the second row corresponds to an interaction cluster definition for a first interaction cluster represented by or corresponding to a first cluster of interaction sequence vectors defined by a volume specified in the first element of row two of information 319. The action to be taken corresponding to when an interaction sequence is found to correspond to interaction cluster 1, e.g., tag the contact as a suspected fraudulent contact and forward the interaction to the team of agents that specializes in handling fraudulent interactions, is shown in the second column 326 of row 2 of information 319. The third column 327 shows that cluster 1 corresponds to fraudulent service request or a service request by a malicious user. Row 3 of information 319 includes information for interaction cluster 2 including information defining an interaction sequence vector cluster, e.g., in terms of a N dimensional volume, corresponding to interaction cluster 2 and an indication that interaction cluster 2 also corresponds to service request from an inexperienced user. Additional information and actions may be, and normally are, included in information 319 for other interaction clusters corresponding to a normal service request, a fraudulent service request, or a service request by an inexperienced user. Message cluster definition information for interaction clusters associated with normal service request may also be included in information 319 including an expedient service and prompt forwarding of the contact to an agent group that can facilitate prompt frictionless service.

In accordance with some embodiments, the remedial actions, e.g., forwarding to the right agent's group, disconnect, providing slower interaction, automatically collecting additional information about the contact, etc. are automatically invoked as soon as an abnormal interaction flow is detected by the output of the contact behavioral interaction model 327 which may reside in memory 312 as well.

The memory 312 also includes interaction sequence information 350 for one or more interactions sequences, e.g., interaction sequences between various system components such as the DB, IVR, BOT, RPA, etc., which are monitored and stored. For each detected interaction sequence information about the user involved in the interaction sequence is included and, optionally, in some embodiments information indicating the one or more contact center servers or modules with which a user is communicating is also included in the interaction sequence information. Interaction sequence information 350 includes for each interaction sequence, in addition to information identifying the user/contact involved in the interaction sequence, a current interaction sequence vector value. This value will normally be updated as interactions in the corresponding sequence are received with the value being compared to interaction cluster definition information to determine if the interaction sequence matches a defined interaction cluster as may be indicated by the interaction sequence vector of the interaction sequence falling within the interaction sequence vector cluster volume used to define an interaction sequence cluster in the information 319. The interaction sequence information 350 is shown as including user ID, interaction sequence information (351, . . . , 353) for multiple interaction sequences, e.g., interaction sequence 1 to interaction sequence X.

Figure 4:
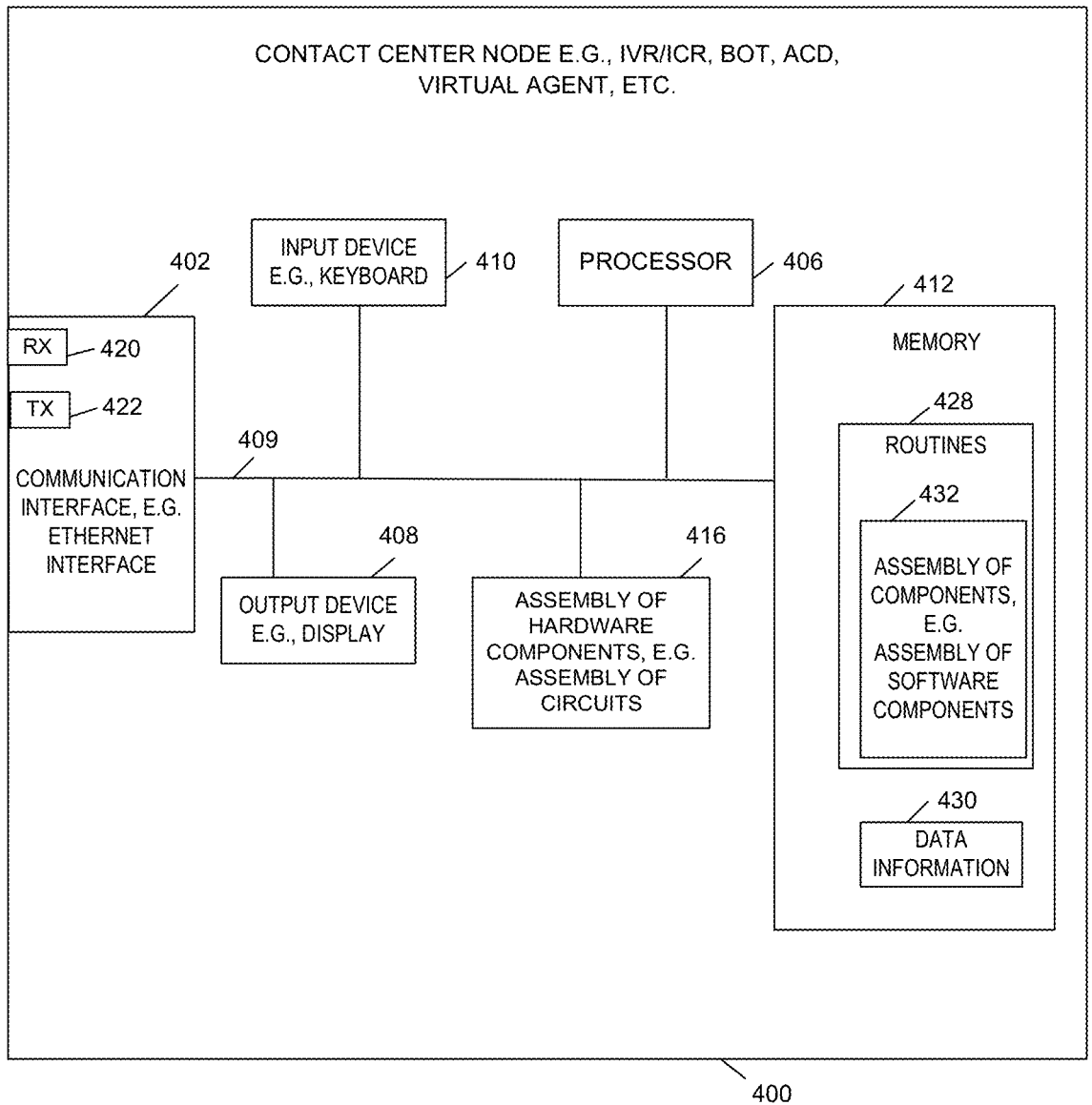
FIG. 4 is a block diagram illustrating an example network node that can be used as any one of several devices shown in FIG. 1.

FIG. 4 is a drawing of an example contact center node 400, e.g. a server, e.g., IVR/ICR, BOT, RPA, virtual agent, ACD, etc. In some embodiments, network node 400 of FIG. 4 is server 136, 138, 140, 142 of FIG. 1. Contact center node 400, e.g. a server, includes an interactions/communications interface 402, e.g., an Ethernet interface, a telephony interface, messaging interface, etc., a processor 406, an output device 408, e.g., display, printer, etc., an input device 410, e.g., keyboard, keypad, touch screen, mouse, etc., a memory 412 and an assembly of components 416, e.g., assembly of hardware module, e.g., assembly of circuits, coupled together via a bus 409 over which the various elements may interchange data and information. Interactions interface 402 couples the network node 400 to a network and/or the Internet. Interactions interface 402 includes a receiver 420 via which the network node 400, e.g. a server, can receive data and information, e.g., including operation related information, e.g., DTMF requests for changing states of IVR/ICR, RPA, text messages via an SMS or a text interface, voice commands via telephony or voice over IP interface (internet), etc. The transmitter 422 enables network node 400, e.g., a server, sending data and information, e.g., including configuration information, contact classification information, contact distribution/forwarding information, etc.

Memory 412 includes routines 428 and data/information 430. Routines 428 include assembly of components 432, e.g., an assembly of software components and data information 430.

Figure 5:
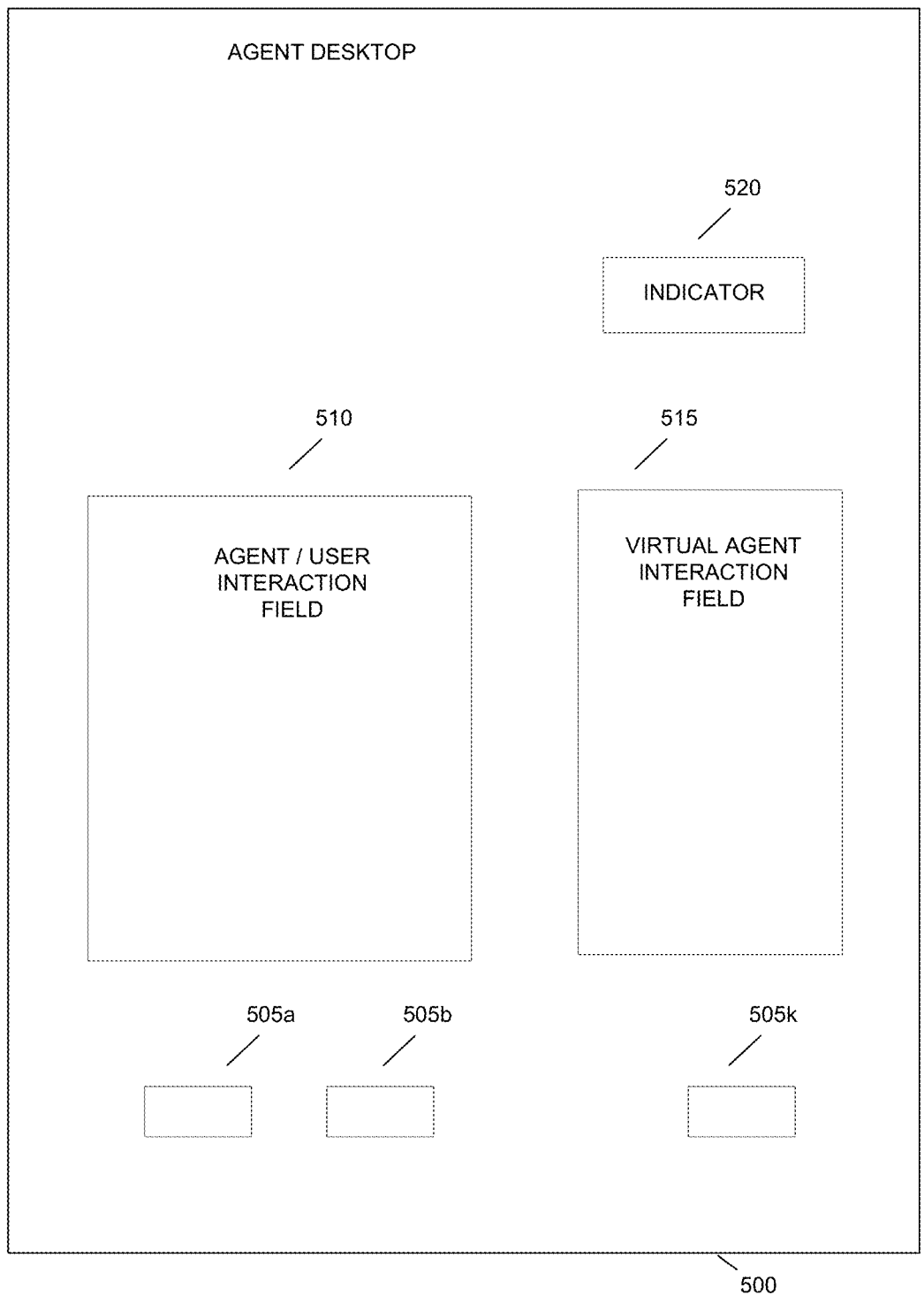
FIG. 5 is a block diagram illustrating an embodiment of an example of an agent desktop/display.

FIG. 5 is a drawing of an example device 500, e.g. an agent desktop, e.g., phone, terminal, PC, tablet, etc. Agent desktop is used by the system to facilitate interaction between a user such as user 102 of FIG. 1 and an agent such as agents 160, 162, or 164 of FIG. 1. Agent desktop includes control buttons 505a-k used by the agent to answer the contact request, transfer the contact to another agent group, request help from a supervisor, etc. Interaction field 510 is used to display input from the user, e.g., user 102 of FIG. 1, as well as the input from the agent such as agents 160, 162, and 164 of FIG. 1, Virtual agent assistance field 515 provides the agent with hints and suggested replies to requests and questions posted by the user, and indicator 520 used by the "contact center management tagging system" to classify and tag the contact as exhibiting a specific behavior such as behavior of a normal valid user, behavior indicative of an unexperienced user, behavior of a malicious actor, etc.

FIG. 6A is a drawing of an example interaction dictionary 600 which is implemented as a table in accordance with an example embodiment. Example interaction dictionary 600 includes index 610 which includes an index number (1-15) for each interaction listed in a row of column 620. The table includes a sample of fifteen interactions but the number of interaction can be much larger with the number of interactions depending on the number of interactions included in a training database and/or the number of unique interaction which are likely to be communicated to/from, e.g., between a user and one or more Contact centers in the system in which the method is used. Thus the dictionary 600 will include the possible interactions which can pass over an interface between a user and a contact center, e.g., contact center 130 of FIG. 1, as well as interactions between the various modules of the contact center, e.g., servers and modules 132, 134, 136, 138, 140, and 142 of FIG. 1.

Column 620 provides the names of the individual indexed interactions. The name may include, and often does, the interaction type and, in some cases the timing between interaction events such as the time between a request for information and the returned input from the user, as well as indicator whether the input was correct or erroneous. Column 630 of the dictionary 600 provides comments that explain the interaction in the row to which the comment corresponds and is included to facilitate user understanding of the interactions but can be omitted from the memory of a device implementing the method if desired to save data. Message fields such as the user ID, the IP address or the ANI number of the user associated with the contact initiated by the user, or an automated device, may be, and often are, omitted from the dictionary.

Figure 6B:
FIG. 6B shows a set of information in the form of interactions and corresponding example three-dimensional interaction vectors stored used in an example embodiment.

FIG. 6B shows a set of contact interaction information in table 608, which is similar to the interaction dictionary 600 of FIG. 6A. Table 608 of FIG. 6B includes an index column 611, an interaction column 621 and interaction vector column 631. Each row of the table 608 corresponds to a different interaction. An example three dimensional interaction vector corresponding to the row of an interaction provides the interaction vector corresponding to the interaction in the row. For example the interaction ENT_ID_Req is indexed as the first interaction in the table 608 and is identified by index 1 and has a corresponding interaction vector [−0.2738705, 0.83762, 5.475938]. While in the example the number of dimensions N of the example interaction vector is three, with the interaction vector thus including three distinct elements with corresponding values, in some implementations interaction vectors with a larger number of dimensions is used with interaction vector sizes of between 10 and 20 dimensions being common. Larger vector sizes can also be used. Each value corresponding to a different dimension depends on or more features associated with the interaction to which the vector corresponds. It should be appreciated that the values for individual elements or dimensions of the interaction vector are not necessarily related to any feature of the interaction but rather are mathematical expressions derived by the machine learning training process.

Column 640 of FIG. 6B could be included as a column in the interaction dictionary 600 of FIG. 6A but is shown separately since during use table 608 can be used to determine the interaction vector corresponding to a detected interaction without the need to consult dictionary 600 which also includes human understandable comments.

In some embodiments for interaction vector determination purposes, the position where an interaction occurs in an interaction sequence is taken into consideration with the position of the interaction in the sequence in combination with the interaction determining the interaction vector corresponding to an interaction.

The information tables shown herein can be generated during a training phase based on interaction sequences collected over a period of time. During use the tables can be static, but in some embodiments they are updated at various points in time based on interaction sequences collected during use of the tables to determine if a detected interaction sequence corresponds to a fraudulent service request or a service request by an inexperienced user experience as indicated by the interaction sequence being matched to an interaction sequenced vector cluster with which fraudulent service request or a service request by an inexperienced user is associated.

It should be appreciated that while FIG. 6B (and FIG. 7 as described in greater details below) are examples that map each interaction to a vector of three dimensions, this is done for illustration proposes and that vectors of other larger sizes will often be used. As indicated above practical system may use much higher dimensionality for the vector such as vectors of 15 to 30 dimensions.

Figure 7:
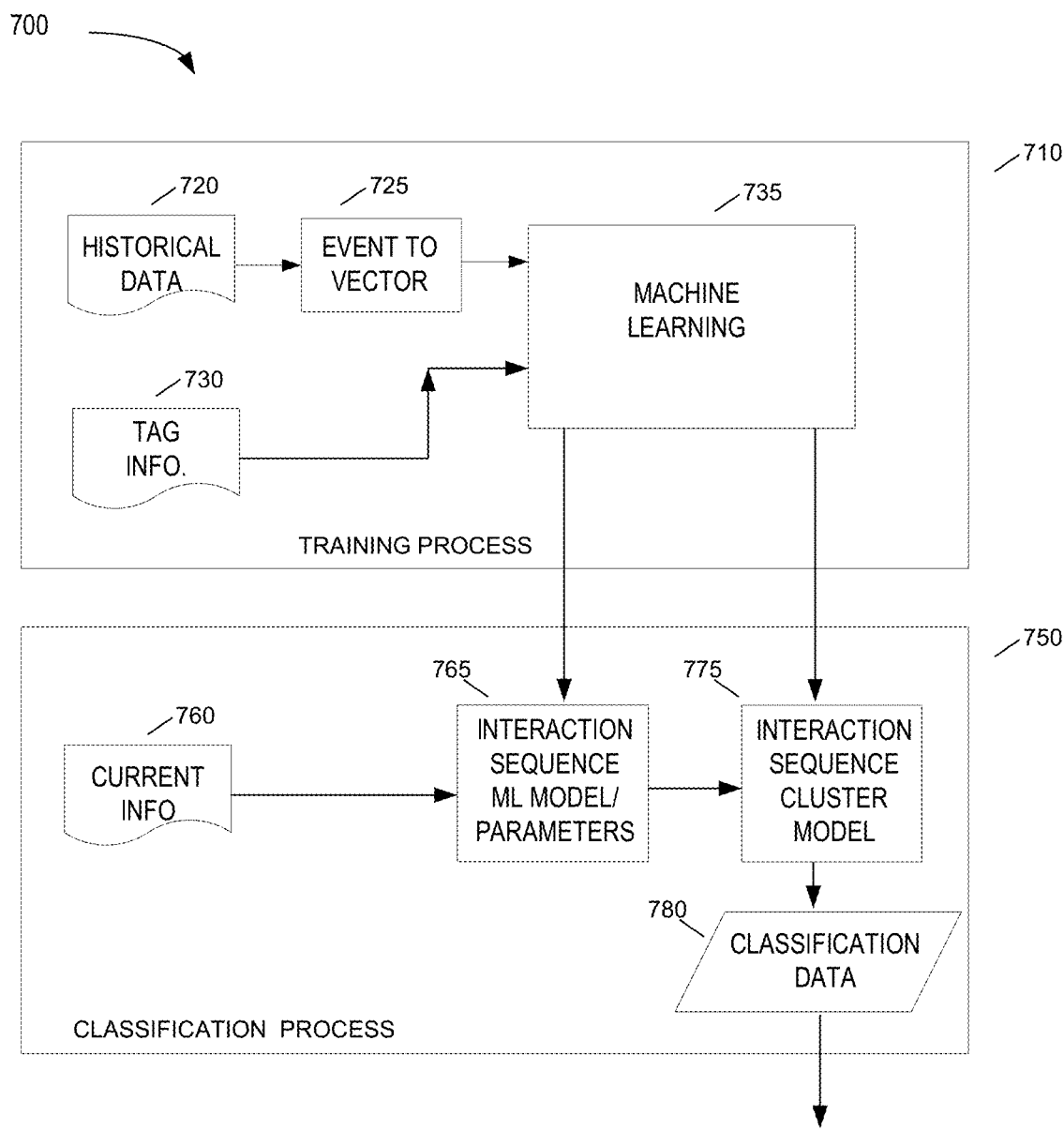
FIG. 7 illustrates an example of simplified diagram which can be used to classify interactions.

FIG. 7 illustrates an example of simplified diagram which can be used to classify interactions. Process 710 illustrates a simplified training process which maps a sequence of events to a vector of sequence of events and establishes a machine learning model of the messages/event sequences used for classifying messages events in real time.

Process 710 utilizes historical messages and event data 720 to establish a dictionary of events/messages such as the one illustrated in FIG. 6A. The process then uses algorithm 725 to map the messages/events to an N dimensional vector, e.g., Word2Vec. Other ML algorithms can be used to establish such mapping without changing the scope of the present disclosure. The vectors associated with the messages/events, which correspond to historical sequences of contacts, are fed along with known tagging information 730 into a ML process 735. In accordance with one example implementation, the ML module 735 may use a long short-term memory (LSTM) model. Other models can be used without changing the scope of the present disclosure. The N dimensional vector that corresponds to each contact is tagged as corresponding to a specific class of contacts, e.g., fraudulent contact, normal contact, contact initiated by an inexperienced users, etc.

The parameters of the model that map the messages/event 765 resulting from the historical training data 720 and the tagging information 730 are stored in memory for use in the real time classification process 750. Similarly, the interaction sequence clustering model 775 which is determined by the machine learning process 735 is stored as well.

In operation, once the contact center system determines that a new contact is being initiated, the system collects real time messages and events 760. These messages and events are fed into the interaction sequence ML model/parameters 765 resulting in an interaction sequence vector that corresponds to the ongoing interaction with a specific contact.

The interaction sequence vector at the output of module 765 is compared against the interaction sequence cluster model 775 and based on the result, e.g., the vector being in a cluster corresponding to a specific class of interactions, the classification is determined. The system then takes actions based on the classification.

Figure 8:
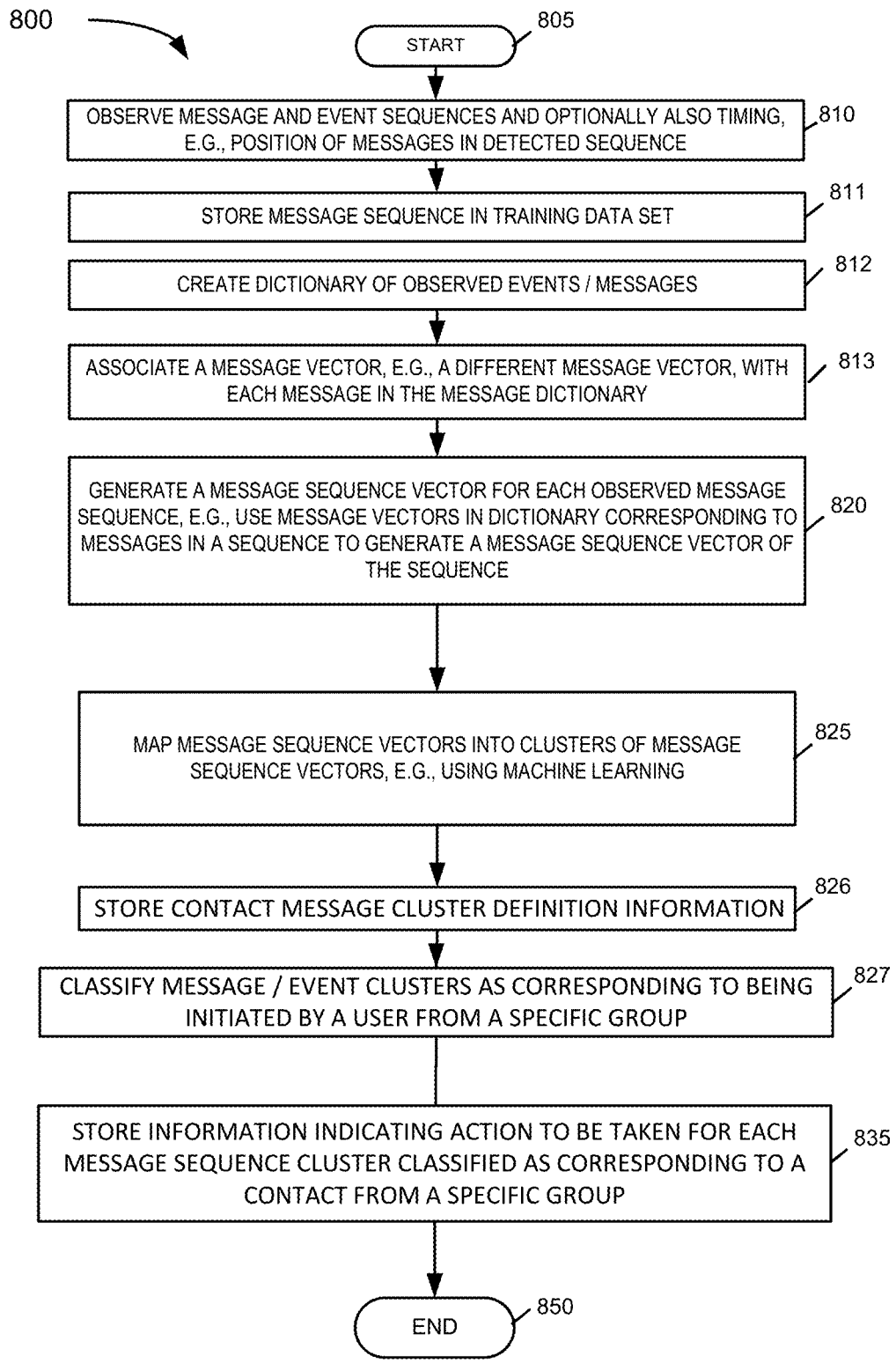
FIG. 8 is a flowchart illustrating a training and information storage process which can be used in the system of FIG. 1 to store information that can be used to classify an interaction of a specific contact and take appropriate action.

FIG. 8 illustrates a flowchart showing the steps 800 of a training and information storage process which can be used in the system of FIGS. 1-7 to store information that can be used to determine if a detected interaction sequence corresponds to an interaction sequence cluster and what if any remedial actions should be taken when an interaction sequence is determined to correspond to an interaction sequence cluster corresponding to fraudulent service request or a service request by an inexperienced user.

The method 800 includes various example steps which may be used in some, but not all embodiments, as part of the process of creating and updating an interaction dictionary and storing a set of information for later use.

The method starts in start step 805 when it is implemented by a device, e.g., such as the contact center management system 130 which receives detected interactions communicated between a user and a contact center, or between various component of the contact center, in the system shown in FIG. 1. Operation proceeds from start step 805 to step 810 in which interaction, e.g., messages and/or event, sequences and also timing are observed. The timing may, and in some embodiments does, correspond to the position of an interaction in an interaction sequence to which the interaction corresponds. The observations made in step 810 can be performed by any module of FIG. 1 and communicated to the contact center 130 implementing the method 800 or the observations can be made monitoring a stream of interactions by one or more contact centers, extracting fields of interest from the observed interactions and sending them to the contact center management system 130 for observation and/or use in generating a training database of interaction sequences.

Operation proceeds from step 810 to step 811 where the observed interaction sequences are stored in a data set to be used for training purpose. Then in step 812 the contact center management system 130 creates a dictionary of observed interactions with at least one entry for each observed interaction event/message between a user and the contact center, and/or between components of the contact center. In the case where interaction timing is considered, the dictionary can include one entry for each time position at which a particular interaction is detected. In some but not all interaction embodiments timing delay/interval between interactions is considered and the dictionary includes different entries for each interaction and associated delay from a previous interaction in a sequence. The dictionary can be the same or similar to the dictionary 600 shown in FIG. 6A or the interaction lists shown as the first two columns of FIG. 6B.

With interactions in the set of training data having been identified, along with timing information in some embodiments, the method proceeds to behavioral interaction vector generation step 813. In step 813 an interaction vector is generated for each interaction or interaction/timing combination included in the dictionary that was generated in step 812. The generated interaction vector includes N dimensions where the individual element corresponding to a dimension is generated based on one or more specific interaction, the position in which the interaction appears in interaction sequences, the timing between the said interaction and the preceding interaction, etc. As noted above vectors may include a large number of dimensions e.g. 10 to 30 depending on the embodiment. The contact interaction vectors may be and sometimes are stored in memory as part of a table which includes the interaction dictionary information. The stored table may be, and sometimes is, the same or similar to the tables shown in FIG. 6B.

With interaction vectors having been generated for the interactions in the training set of data which are included in the generated dictionary, operation proceeds to step 820 in which interaction sequence vectors for individual interaction sequences in the training set of data are generated in step 820. Interaction sequences are between a user and the contact center or between modules of the contact center with interaction between different users and/or different components of the contact center corresponding to different interaction sequences.

As noted above the contact center management system monitors and reports interactions to facilitate training. In some embodiments prior to training the system monitors interaction exchanges between the user and one or more contact center modules. Assuming that the monitoring happens during a long period of time, interactions corresponding to a large number of different sequences may be collected, for example, 1,000,000 interactions may be collected over several days, week, or months to be used for training purposes. The beginning of an interaction sequence and how many of the following interactions belong to a particular individual sequence of interactions can be determined automatically or by a human labeling the interaction sequences to facilitate a training process. The identification of interaction sequences, their beginning and their end can be done manually, wherein a technical person identifies the sequences. Another automated approach is used in some embodiments to identify interactions that are used at the beginning of an exchange/contact between a user and a contact center until the end of such interaction resulting from termination of the interaction.

In step 825 the method maps sequence vectors from contacts into clusters corresponding to the various classes of contacts, e.g., normal contacts, fraudulent contacts, contacts initiated by inexperienced users, etc. Given the fact that the sample of normal contacts is much larger than the number of sequences for the fraudulent contacts and or the number of contacts initiated by inexperienced users, the classification can be done first to characterize the normal contacts and then classify all other contacts as requiring additional attention.

Once the interaction sequence vectors for the contact interaction sequences in the training set of data having been generated and stored in step 820, operation proceeds from step 820 to step 825 in which the determined interaction sequence vectors are processed, e.g., mapped, into clusters. Any of a variety of clustering techniques, such as those used for machine learning, can be used to map the interaction sequence vectors into clusters in step 825. The result of the clustering in step 825 is a plurality of interaction cluster definitions which are stored in step 826. The interaction cluster definitions can and sometimes do include an individual value for each of the N elements of an interaction sequence vector and a range indicating the permitted deviation from the elements values that can occur with an interaction still belonging to the cluster. For example, the value for an element included in an interaction cluster definition may be a median or average value, depending on the embodiment, for the elements of interactions found to correspond to the individual cluster. For example an N dimensional cluster may include N dimension elements in the form of values and a corresponding N ranges. Other N dimensional descriptions of the volume of each interaction vector cluster may be used as an alternative way of defining a cluster.

With the contact interaction clusters having been identified and defined, operation proceeds to step 827 wherein the individual defined interaction clusters are classified or labeled as corresponding to contact initiated by a normal user, a malicious user, an inexperienced user, etc. This may be done automatically, based on service level metrics for communication sessions corresponding to the interaction sequences in the cluster being below a predefined level used to identify fraudulent service request or a service request by an inexperienced user of the remaining interaction sequence clusters which are not deemed to correspond to fraudulent service request or a service request by an inexperienced user level can be deemed to correspond to good service level clusters. While the classification and labeling of interaction sequence clusters can, and sometimes is, performed automatically, in some embodiments interaction sequence clusters are manually labeled by a contact center administrator as corresponding to good or fraudulent service request or a service request by an inexperienced user.

In step 835 information indicating action to be taken for each contact interaction sequence vector cluster labeled as corresponding to normal service request, a fraudulent service request, or a service request by an inexperienced user is stored in association with the contact interaction sequence cluster definition and the fraudulent service request or a service request by an inexperienced user indication for the interaction sequence vector cluster.

Thus by the end of the training in end step 850 a set of information will have been generated and stored which allows for interaction sequences to be processed in real time, checked to determine if an interaction sequence corresponds to an interaction sequence vector cluster for which a remedial action is to be taken. By taking the remedial action in real time fraudulent service request or a service request by an inexperienced user can be ameliorated or mitigated.

Figure 9:
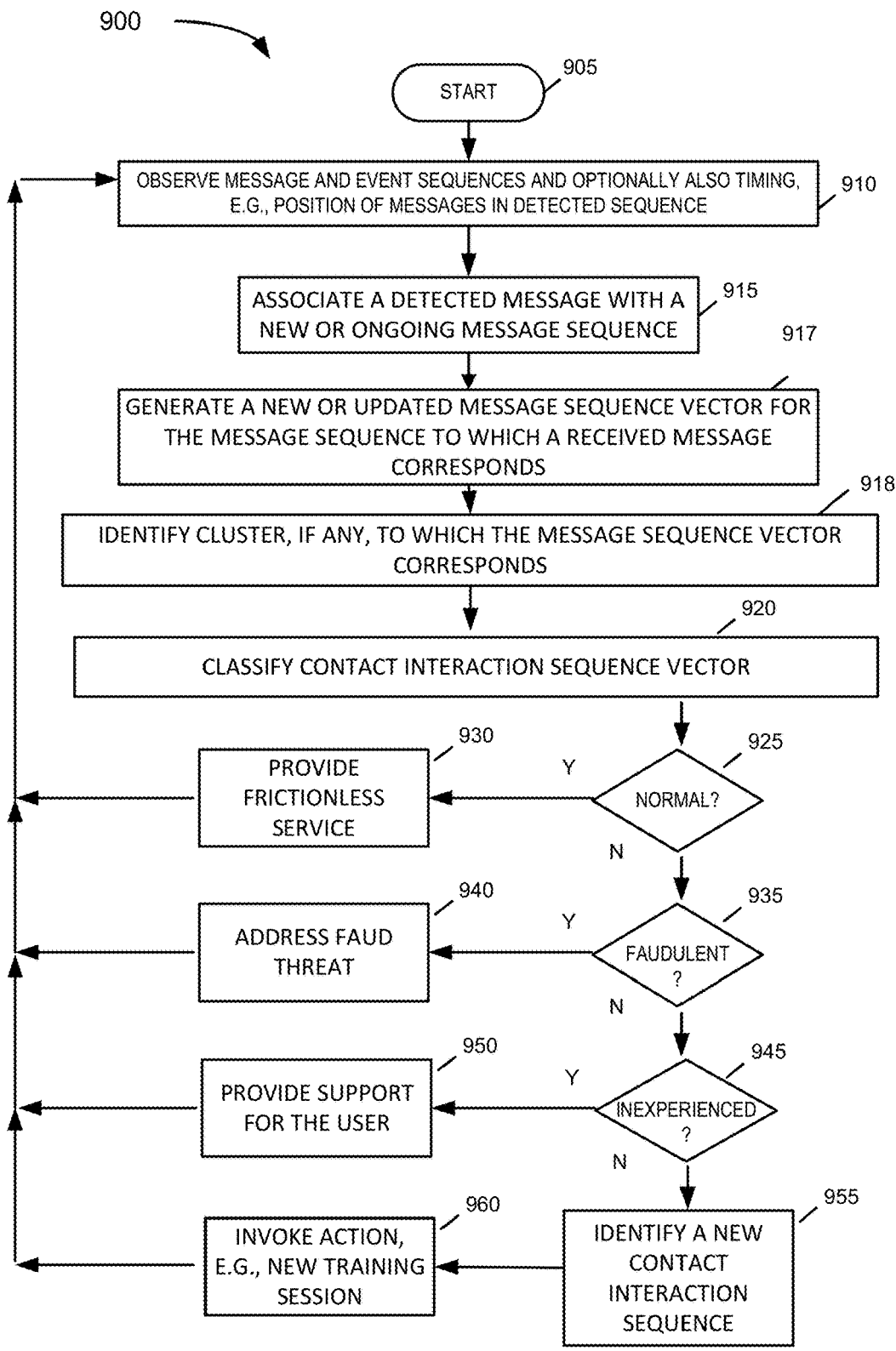
FIG. 9 illustrates a method which can be used in the system of FIG. 1 to detect interaction sequences, between Users and Contact centers, corresponding to interaction sequence clusters known to correspond to fraudulent service request or a service request by an inexperienced user levels and mitigation actions to reduce the likelihood of fraudulent service request or a service request by an inexperienced user.

FIG. 9 illustrates a method which can be used in the system of FIG. 1 to detect interaction sequences, between users and contact center, corresponding to interaction sequence clusters known to correspond to fraudulent service request or a service request by an inexperienced user levels and mitigation actions to reduce the likelihood of adverse impact from a fraudulent service request or a service request by an inexperienced user. The method shown in FIG. 9 is implemented by the network management system 130 after the initial training discussed with regard to FIG. 8 has been completed. The method of FIG. 9 can be implemented and used while interactions of interactions sequences is ongoing to detect and mitigate, e.g., in real time while interactions of a user with the contact center is ongoing.

The method shown in the flowchart 900 begins with start step 905 which corresponds to the processor of the contact center management system beginning to execute instructions, e.g., of a real-time monitoring and contact center management routine executed by the processor 306 of the contact center management system 300 which can be, and sometimes is, used as the contact center management system 130 of the system shown in FIG. 1.

Operation proceeds from start step 905 to monitoring/observation step 910 in which the contact center management system monitors, e.g., observes, interaction corresponding to interaction sequences and optionally also timing of interactions. In step 910 the time an interaction is received or transmitted at the contact center can be documented thereby allowing the order and/or timing between consecutive contact interaction events/messages in a sequence to be determined from the timing information once an interaction is mapped, e.g., identified as corresponding to, a particular interaction sequence. In at least some embodiments, as previously discussed, individual interaction sequences correspond to interactions between an individual user and one or more contact centers which are being used by the user to obtain information and/or control resources. It should be appreciated that while a user may start an interactions related interaction sequence with one contact center module or resource, as the interaction progresses, handling of the contact may be transferred to another module or agent within the contact center.

Detection of an interaction in monitoring step 910, which is performed on an ongoing basis, causes operation to proceed with respect to an individual detected interaction to step 915. In step 915 the interaction detected by the monitoring performed in step 910, is associated with a new or ongoing contact interaction sequence. The information for each contact interaction sequence is stored and analyzed by the ML module. Matching of interactions to interaction sequences can be performed by examining the associated user ID, a session ID, a contact ID, etc., of ongoing interaction sequences. If a match is found and the interaction is an interaction which does not indicate a start of a new interaction sequence, the interaction is associated with the existing contact interaction sequence, e.g., as a next interaction in the sequence. The interaction sequence information includes information identifying devices (or a user ID) to which the interaction sequence corresponds, the contact interactions in the sequence and the time information which can be used to determine the order of and/or timing between interactions is stored in memory 312 of the contact center management system.

Operation proceed from step 915, in which an contact interaction is associated with an interaction sequence, to step 917, in which an interaction sequence vector for the interaction sequence with which an interaction was associated is generated or updated if the interaction sequence is an existing interaction sequence, based on the detected interaction. This may be done, for example, using the information shown in FIG. 6B.

With the interaction sequence vector having been generated in step 917 operation proceeds to step 918 in which the generated contact interaction sequence vector is, examined, e.g., compared to the interaction sequence definitions, e.g., cluster definition, such as classification data 780 of FIG. 7, to determine if the interaction sequence vector corresponds to one of the interaction sequence clusters. This can be done by determining if each of the values in the generated interaction sequence vector fall within the range of the values used to define an interaction sequence cluster. For example, does the first value fall in the range of the first value in the interaction cluster definition, does the second value fall within the range of the second value in the interaction cluster definition and so on, with each of the values of the generated interaction sequence vector having to fall in the corresponding range specified in the cluster definition for there to be a match with the defined contact interaction sequence cluster definition with which a specific contact classification have been defined and potentially corresponding action has been associated.

In another example implementation, the step examines whether the contact interaction sequence vector falls within the determined volume of a specific contact interaction vector cluster.

In step 920 the contact interaction sequence vector is classified as belonging to one of the determined clusters (or as not being associated with one of the clusters). Operation moves from step 920 to a decision step 925 in which a determination is made whether the contact belongs to a class of normal contacts.

If the contact interaction sequence vector is determined in the decision step 925 that the contact is a normal contact (Y branch), the user is provided with a frictionless in step 930, and the method loops back to step 910 where the contacts continue to be observed. However if operation 925 does not determined that the contact was initiated by a normal user (N branch), operation proceeds to step 935.

If the contact interaction sequence vector is determined in the decision step 935 that the contact is a fraudulent contact (Y branch), the contact is directed to step 940 where the fraudulent contact is handled, e.g., by disconnecting the contact or by directing the contact to agent group that specializes in dealing with such contacts, and the method loops back to step 910 where the contacts continue to be observed. However if operation 935 does not determined that the contact was initiated by a fraudulent user (N branch), operation proceeds to step 945.

If the contact interaction sequence vector is determined in the decision step 945 that the contact is initiated by an inexperienced contact (Y branch), the contact is directed to step 950 where the inexperienced user is forwarded to an agent group that specializes in helping such users, or alternatively, to an automated response server that provides a more detailed and slower information. The method then loops back to step 910 where the contacts continue to be observed. However if operation 945 does not determined that the contact was initiated by an inexperienced (N branch), operation proceeds to step 955.

In step 955 the method determines that it identified a new and unrecognized contact interaction sequence. Operation proceeds to step 960 where an action is taken such as one or more of manually classifying the sequence as belonging to an existing contact class, identifying a new class of contacts, invoking a new training session, forwarding the contact to a special group agents, etc. The method then loops back to step 910 where the contacts continue to be observed.

Next, the vectors associated with each interaction from the interaction dictionary are used to map sequence of interactions into an associated vector. In its simplest form, this mapping can take the form of averaging the vectors of all the interactions in an interaction flow sequence:

$$Seq\ Vec = \text{sum}(V1+V2+\ldots V1)/1 \qquad \text{Eq. 1;}$$

where:
  Seq Vec is a vector representing an interaction flow sequence;
  M is the number of interactions in the interaction sequence flow; and
  1 is the number of interactions in a specific interaction sequence.

(The simple mapping of Eq. 1 is mentioned as an example, and those skilled in the art should recognize that other mapping algorithms are also covered by the present disclosure.)

Well known ML techniques (e.g., K-mean clustering) are used to map the interaction sequence vectors (vectors associated with each messaging sequence) into clusters of messaging sequences. For example, a cluster of interaction sequences may be a collection of interaction sequence vectors that exhibit a short distance between the various interaction sequences vectors.

Once the interaction sequence model is constructed, all new interactions between UEs and Contact centers are mapped into an interaction sequence vector in a similar process to the one described above. The cluster to which the observed interaction sequence vector belongs is identified. For example, ML may classify the vector as belonging to one of the clusters previously identified. Alternatively, the interaction sequence vector may be associated with the cluster that it is closest to its centroid. Where the centroid of the cluster may be defined as:

$$\text{Cluster Centroid} = (\text{Sum of vectors in the cluster})/N \qquad \text{Eq. 2.}$$

Figure 10:
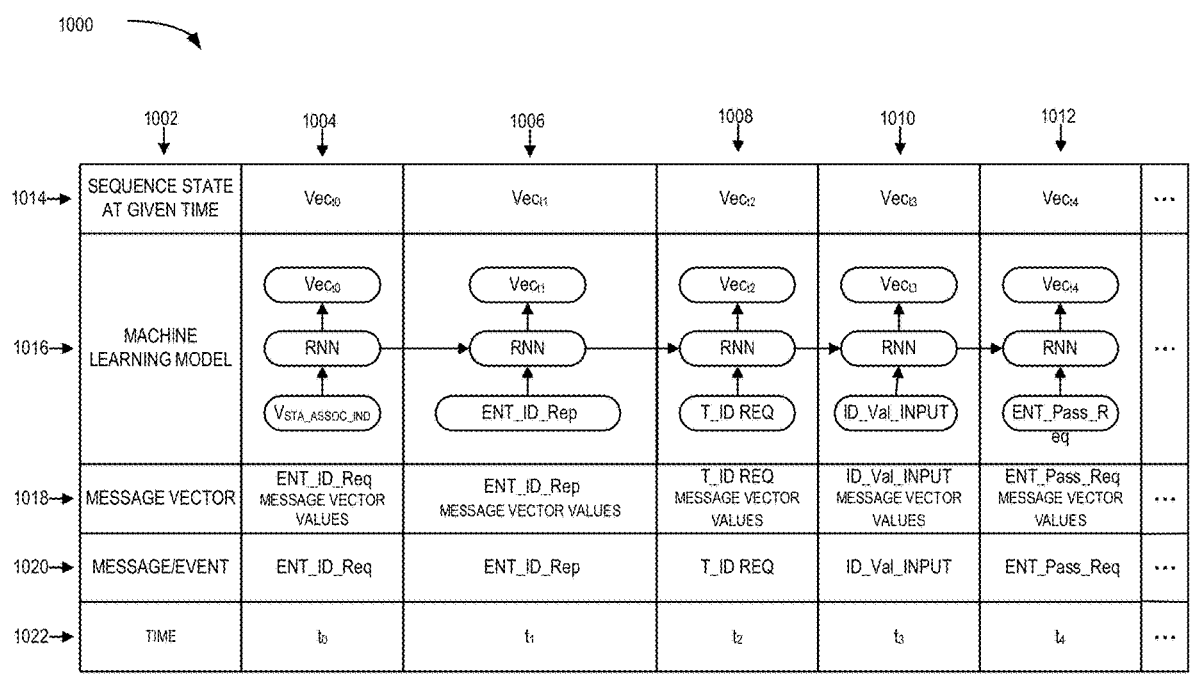
FIG. 10 shows a process wherein an interaction vector for a detected interaction is used to update a current interaction sequence vector corresponding to the interaction sequence to which the detected interaction corresponds to generate an updated interaction sequence vector.

FIG. 10 illustrates another embodiment for mapping interaction vectors into an interaction sequence vector using a recurrent neural network (RNN). The inputs events/messages/data into the RNN are provided in row 1022, and the time at which these data is encountered is provided in row 1024. For example the ENT_ID_Req is presented at time to, the ENT_ID_Rep is presented at time $t_1$, etc.

As described above, the input/data is converted to vectors e.g., by a program such as Word2Vec. The resulting vectors are shown is row 1018. These vectors (which represent the data inputs of row 1020) are fed as input into the machine learning model such as the RNN illustrated in row 1016. At different times, illustrated by row 1022, the state of the RNN changes and a new value is presented at the output of the ML system, illustrated in row 1014, which in some embodiments can be used to represent the interaction sequence vector.

For example, at time to corresponds to column 1004, input data ENT_ID_Req is converted to input data vector ENT_ID_Req MESSAGE VECTOR VALUES. This vector serves as input into the RNN resulting in an output interaction sequence vector $\text{Vec}_{t0}$. Similarly at time $t_1$ corresponds to column 1006, input data ENT_ID_Rep is converted to input data vector ENT_ID_Rep MESSAGE VECTOR VALUES. This vector serves as input into the RNN resulting in an output interaction sequence vector $\text{Vec}_{t1}$.

The process continues in a similar manner to process inputs T_ID_Rec, ID_VAL_Input, and ENT_Pass_Req, resulting in interaction sequence vectors $\text{Vec}_{t2}$ through $\text{Vec}_{t4}$ at times $t_2$ through $t_4$ respectfully each one representing a value of an interaction sequence vector applicable for the associated time.

Advantageously, the techniques described herein thus provide passively qualifying contacts, such as for contact center. In particular, the techniques herein provide an automated system that can assess the risk associated with each contact and reliably flag suspicious contacts without requiring cumbersome heuristics rules, automatically adapting and learning new attack vectors. Mechanisms are also provided above to mitigate against these attacks, particularly with changing characteristics, and to identify users who are in a need for help and direct them to the proper resources.

Figure 11:
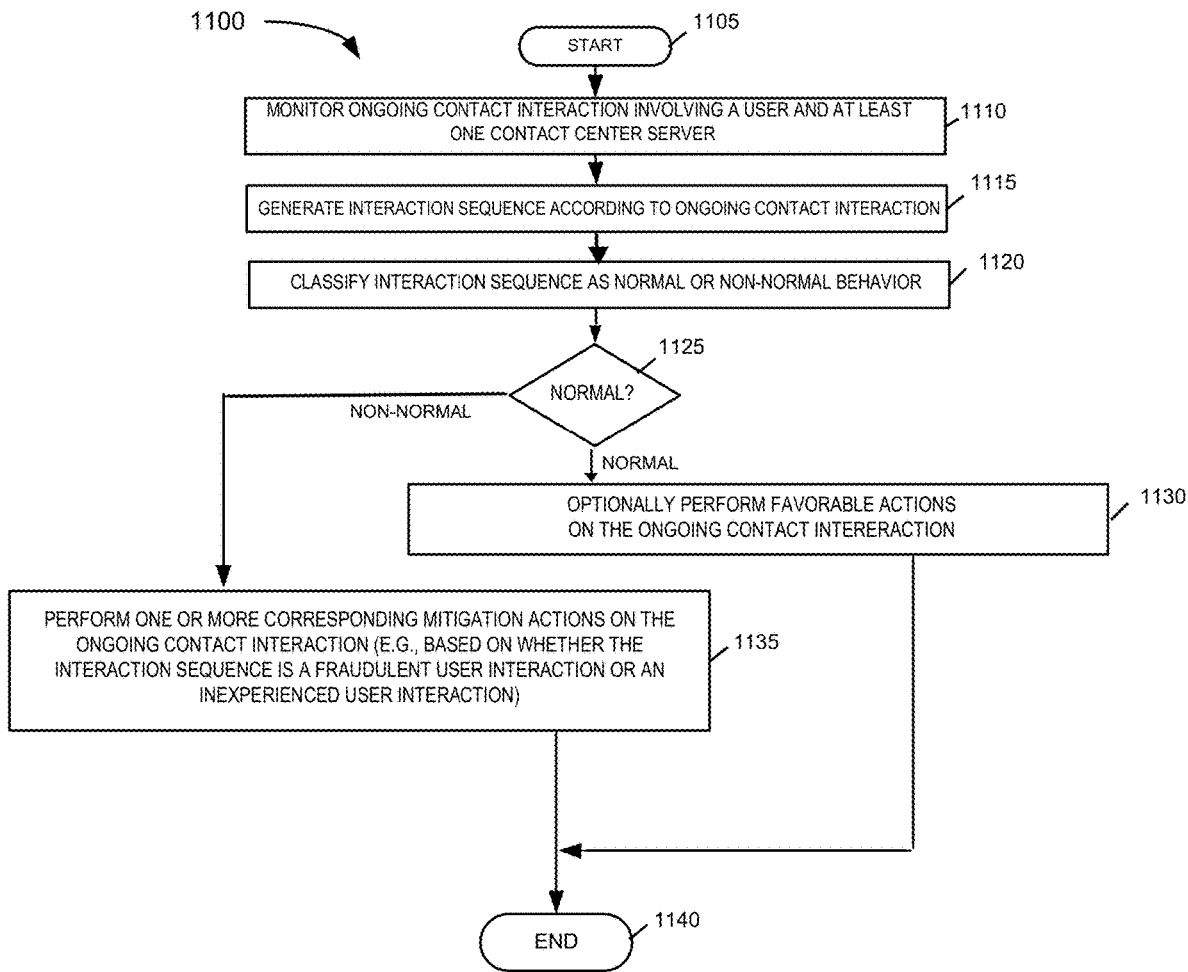
FIG. 11 illustrates an example simplified procedure for passively qualifying contacts in accordance with one or more embodiments described herein.

In closing, FIG. 11 illustrates an example simplified procedure 1100 for passively qualifying contacts in accordance with one or more embodiments described herein. For example, a non-generic, specifically configured device (e.g., contact center server or otherwise) may perform procedure 1100 by executing stored instructions (e.g., a process). The procedure 1100 may start at step 1105, and continues to step 1110, where, as described in greater detail above, the techniques herein monitor an ongoing contact interaction involving a user and at least one contact center server. Then, in step 1115, the techniques herein generate an interaction sequence according to the ongoing contact interaction (e.g., an interaction sequence vector, as detailed above).

In step 1120, the techniques herein may then classify the interaction sequence as one of either "normal" or "non-normal" based on one or more behavioral models of interaction sequences (e.g., a fraudulent user interaction or an inexperienced user interaction). As illustrated above, classifying the interaction sequence as one of either normal or non-normal may be specifically based on comparing the interaction sequence vector to one or more behavioral models of interaction sequence vectors (e.g., clustering a plurality of individual stored interaction sequences into one of either a normal interaction sequence cluster or a non-normal interaction sequence cluster, where classifying the interaction sequence as one of either normal or non-normal is based on determining whether the interaction sequence corresponds to either the normal interaction sequence cluster or the non-normal interaction sequence cluster).

Note, also, that as detailed above, the techniques herein may cluster a plurality of individual stored interaction sequences into one of: a normal interaction sequence cluster, a fraudulent user interaction sequence cluster, or an inexperienced user interaction cluster. As such, classifying the interaction sequence as one of either normal or non-normal may thus be based on determining whether the interaction sequence corresponds to the normal interaction sequence cluster, the fraudulent user interaction sequence cluster, or the inexperienced user interaction cluster, accordingly.

In decision step 1125, if the classification is a normal user interaction, then the techniques herein may continue "as normal", or, optionally in step 1130, may perform one or more corresponding favorable actions on the ongoing contact interaction (e.g., expedited treatment, specific call center agents, etc.). On the other hand, if the classification in step 1125 is a non-normal user interaction (e.g., fraudulent or inexperienced or otherwise), then in step 1135 the techniques herein may perform one or more corresponding mitigation actions on the ongoing contact interaction (e.g., corresponding to whether the ongoing contact interaction is classified as a fraudulent user interaction or an inexperienced user interaction, or otherwise). Examples may include, but are not limited to, directing the ongoing contact interaction to a call center agent having a specific type of training (e.g., for fraudulent or inexperienced users), disconnecting the ongoing contact interaction, generating a report of the ongoing contact interaction, and so on. Note, too, that the mitigation actions may be performed on the ongoing contact interaction in real-time, or afterward (e.g., reporting, flagging, analyzing, etc.).

Notably, as described above, classifying the interaction sequence as one of either normal or non-normal further may optionally include a classification of the interaction sequence within one or more sub-classifications of either normal or non-normal interaction sequences. That is, as mentioned, simplified binary classifications of "good" or "bad" may be one example, but various levels of classification may be made herein, such as based on level of experience, level of speed, level of anger/aggression, levels of fraudulent behavior, and so on. As such, the associated mitigation actions may correspondingly have multiple levels of responsiveness, accordingly.

The simplified procedure 1100 may then end in step 1140, notably with the ability to continue evolving the trained models, the classification of contact interactions, and so on, accordingly. Other steps may also be included generally within procedure 1100. For example, such steps (or, more generally, such additions to steps already specifically illustrated above), may include other techniques and/or other specific embodiments as described herein, such as, e.g., determining an inability to adequately classify the interaction sequence according to the ongoing contact interaction (e.g., based on at least one additional interaction by the user with the at least one contact center server), generating an updated interaction sequence according to continued monitoring of the ongoing contact interaction, classifying, the updated interaction sequence as one of either normal or non-normal based on the one or more behavioral models of interaction sequences, and performing, in response to the updated interaction sequence being classified as non-normal, one or more corresponding mitigation actions on the ongoing contact interaction.

It should be noted that while certain steps within the procedures above may be optional as described above, the steps shown above are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Also, while certain procedures have been shown separately, certain steps from certain procedures may be used in other shown procedures, and so on.

Illustratively, the techniques described herein may be performed by hardware, software, and/or firmware, such as in accordance with a process, which may include computer executable instructions executed by a processor (of a particular correspondingly operative computing device) to perform functions relating to the techniques described herein, e.g., in conjunction with other devices which may have a correspondingly configured processes depending upon the functionality of the device, as described below (e.g., a user device, a storage server, a call center device, a controller device, an attestation service, and so on).

In one example embodiment herein, an illustrative method may comprise: storing in a storage device, a contact interaction sequence vector to interaction sequence vector cluster; mapping information for a plurality of contact interaction sequence clusters mitigation associated with a normal contact, a fraudulent contact request or a request for contact by an inexperienced user; storing for at least some individual contact interaction sequence clusters, in said plurality of contact interaction sequence clusters mitigation associated with a fraudulent contact request or a request for contact by an inexperienced user, a corresponding mitigation action; detecting a contact interaction of a first ongoing interaction sequence involving a first user and at least one contact center server; updating a first contact interaction sequence vector based on at least the detected contact interaction of the first ongoing interaction sequence; determining if the first ongoing interaction sequence corresponds to one of the plurality of contact interaction sequence clusters mitigation associated with a fraudulent contact request or a request for contact by an inexperienced user; and in response to determining that the first ongoing contact interaction sequence corresponds to one of the plurality of contact interaction sequence clusters mitigation associated with a fraudulent contact request or a request for contact by an inexperienced user, performing the mitigation action corresponding to the one of the plurality of contact interaction sequence clusters to which the first ongoing interaction sequence is determined to correspond.

In one embodiment, in response to determining that the first ongoing contact interaction sequence does not correspond to one of the plurality of contact interaction sequence clusters mitigation associated with a normal contact request, a fraudulent contact request, or a request for contact by an inexperienced user, the method further comprises: monitoring to detect another interaction of the first ongoing interaction sequence involving the first user; and in response to detecting another interaction of the first ongoing interaction sequence involving a first user and a contact center, repeating said steps of: i) updating the first interaction sequence vector based on at least the detected interaction of the first ongoing interaction sequence; ii) determining if the first ongoing interaction sequence corresponds to one of the plurality of interaction sequence clusters mitigation associated with a normal contact request, a fraudulent contact request, or a request for contact by an inexperienced user; and iii) in response to determining that the first ongoing interaction sequence corresponds to one of the plurality of interaction sequence clusters mitigation associated with a fraudulent contact request or a request for contact by an inexperienced user, performing the mitigation action corresponding to the one of the plurality of interaction sequence clusters to which the first ongoing interaction sequence is determined to correspond.

According to one or more embodiments herein, an illustrative method herein may comprise: monitoring, by a process, an ongoing contact interaction involving a user and at least one contact center server; generating, by the process, an interaction sequence according to the ongoing contact interaction; classifying, by the process, the interaction sequence as one of either normal or non-normal based on one or more behavioral models of interaction sequences; and performing, by the process in response to the interaction sequence being classified as non-normal, one or more corresponding mitigation actions on the ongoing contact interaction.

In one embodiment, classifying the interaction sequence as non-normal comprises: classifying the interaction sequence as one of either a fraudulent user interaction or an inexperienced user interaction. In one embodiment, the one or more corresponding mitigation actions correspond to whether the ongoing contact interaction is classified as a fraudulent user interaction or an inexperienced user interaction.

In one embodiment, the method further comprises: determining an inability to adequately classify the interaction sequence according to the ongoing contact interaction; generating an updated interaction sequence according to continued monitoring of the ongoing contact interaction; classifying, the updated interaction sequence as one of either normal or non-normal based on the one or more behavioral models of interaction sequences; and performing, in response to the updated interaction sequence being classified as non-normal, one or more corresponding mitigation actions on the ongoing contact interaction. In one embodiment, generating the updated interaction sequence according to continued monitoring of the ongoing contact interaction is based on at least one additional interaction by the user with the at least one contact center server.

In one embodiment, generating the interaction sequence according to the ongoing contact interaction comprises: generating an interaction sequence vector. In one embodiment, classifying the interaction sequence as one of either normal or non-normal is based on comparing the interaction sequence vector to one or more behavioral models of interaction sequence vectors.

In one embodiment, the method further comprises: clustering a plurality of individual stored interaction sequences into one of either a normal interaction sequence cluster or a non-normal interaction sequence cluster; wherein classifying the interaction sequence as one of either normal or non-normal is based on determining whether the interaction sequence corresponds to either the normal interaction sequence cluster or the non-normal interaction sequence cluster.

In one embodiment, the method further comprises: clustering a plurality of individual stored interaction sequences into one of: a normal interaction sequence cluster, a fraudulent user interaction sequence cluster, or an inexperienced user interaction cluster; wherein classifying the interaction sequence as one of either normal or non-normal is based on determining whether the interaction sequence corresponds to the normal interaction sequence cluster, the fraudulent user interaction sequence cluster, or the inexperienced user interaction cluster.

In one embodiment, the one or more corresponding mitigation actions are selected from a group consisting of: directing the ongoing contact interaction to a call center agent having a specific type of training; disconnecting the ongoing contact interaction; and generating a report of the ongoing contact interaction.

In one embodiment, performing the one or more corresponding mitigation actions on the ongoing contact interaction occurs in real-time with the ongoing contact interaction.

In one embodiment, the method further comprises: performing, in response to the interaction sequence being classified as normal, one or more corresponding favorable actions on the ongoing contact interaction.

In one embodiment, classifying the interaction sequence as one of either normal or non-normal further includes a classification of the interaction sequence within one or more sub-classifications of either normal or non-normal interaction sequences.

According to one or more embodiments herein, an illustrative tangible, non-transitory, computer-readable medium may have computer-executable instructions stored thereon that, when executed by a processor on a computer, cause the computer to perform a method comprising: monitoring an ongoing contact interaction involving a user and at least one contact center server; generating an interaction sequence according to the ongoing contact interaction; classifying the interaction sequence as one of either normal or non-normal based on one or more behavioral models of interaction sequences; and performing, in response to the interaction sequence being classified as non-normal, one or more corresponding mitigation actions on the ongoing contact interaction.

According to one or more embodiments herein, an illustrative apparatus herein may comprise: one or more network interfaces to communicate with a computer network; a processor coupled to the one or more network interfaces and adapted to execute one or more processes; and a memory configured to store a process that is executable by the processor, the process when executed operable to perform a method comprising: monitoring an ongoing contact interaction involving a user and at least one contact center server; generating an interaction sequence according to the ongoing contact interaction; classifying the interaction sequence as one of either normal or non-normal based on one or more behavioral models of interaction sequences; and performing, in response to the interaction sequence being classified as non-normal, one or more corresponding mitigation actions on the ongoing contact interaction.

While there have been shown and described illustrative embodiments, it is to be understood that various other adaptations and modifications may be made within the scope of the embodiments herein. For example, though the disclosure was often described with respect to banking examples, those skilled in the art should understand that this was done only for illustrative purpose and without limitations, and the techniques herein may be used for any secure communication environment. Furthermore, while the embodiments may have been demonstrated with respect to certain communication environments, physical environments, or device form factors, other configurations may be conceived by those skilled in the art that would remain within the contemplated subject matter of the description above. For example, various components and modules may be distributed in manners not specifically described or illustrated herein, but that provide functionally similar results.

For example, while the write-up described the input to the system as being events, messages, timing, etc., these we brought only as a simple illustration. Those skilled in the art should recognize that other information associated with each contact may be, and often is, used. Such information, without limitation, may include ANI, DNS, SIM information, voice characteristics, typing parameters, background noise, origin of contact, data entry patterns, account balance, etc.

The foregoing description has been directed to specific embodiments. It will be apparent, however, that other variations and modifications may be made to the described embodiments, with the attainment of some or all of their advantages. For instance, it is expressly contemplated that certain components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method, comprising:
   monitoring, by a process, an ongoing contact interaction involving a user and at least one contact center server of a contact center;
   generating, by the process, an interaction sequence according to the ongoing contact interaction with timestamp;
   classifying, by the process, the interaction sequence as one of either normal or non-normal based on comparing the interaction sequence to one or more behavioral models that are trained on historical contact interaction sequences specific to the contact center; and
   performing, by the process in response to the interaction sequence being classified as non-normal, one or more corresponding mitigation actions on the ongoing contact interaction.

2. The method as in claim 1, wherein classifying the interaction sequence as non-normal comprises:
   classifying the interaction sequence as one of either a fraudulent user interaction or an inexperienced user interaction.

3. The method as in claim 2, wherein the one or more corresponding mitigation actions correspond to whether the ongoing contact interaction is classified as a fraudulent user interaction or an inexperienced user interaction.

4. The method as in claim 1, further comprising:
   determining an inability to adequately classify the interaction sequence according to the ongoing contact interaction;
   generating an updated interaction sequence according to continued monitoring of the ongoing contact interaction;
   classifying, the updated interaction sequence as one of either normal or non-normal based on the one or more behavioral models of interaction sequences; and
   performing, in response to the updated interaction sequence being classified as non-normal, one or more corresponding mitigation actions on the ongoing contact interaction.

5. The method as in claim 4, wherein generating the updated interaction sequence according to continued monitoring of the ongoing contact interaction is based on at least one additional interaction by the user with the at least one contact center server.

6. The method as in claim 1, wherein generating the interaction sequence according to the ongoing contact interaction comprises:
   generating an interaction sequence vector.

7. The method as in claim 6, wherein classifying the interaction sequence as one of either normal or non-normal is based on comparing the interaction sequence vector to one or more behavioral models of interaction sequence vectors.

8. The method as in claim 1, further comprising:
   clustering a plurality of individual stored interaction sequences into one of either a normal interaction sequence cluster or a non-normal interaction sequence cluster;
   wherein classifying the interaction sequence as one of either normal or non-normal is based on determining whether the interaction sequence corresponds to either the normal interaction sequence cluster or the non-normal interaction sequence cluster.

9. The method as in claim 1, further comprising:
   clustering a plurality of individual stored interaction sequences into one of: a normal interaction sequence cluster, a fraudulent user interaction sequence cluster, or an inexperienced user interaction cluster;
   wherein classifying the interaction sequence as one of either normal or non-normal is based on determining whether the interaction sequence corresponds to the normal interaction sequence cluster, the fraudulent user interaction sequence cluster, or the inexperienced user interaction cluster.

10. The method as in claim 1, wherein the one or more corresponding mitigation actions are selected from a group consisting of: directing the ongoing contact interaction to a call center agent having a specific type of training; disconnecting the ongoing contact interaction; and generating a report of the ongoing contact interaction.

11. The method as in claim 1, wherein performing the one or more corresponding mitigation actions on the ongoing contact interaction occurs in real-time with the ongoing contact interaction.

12. The method as in claim 1, further comprising:
   performing, in response to the interaction sequence being classified as normal, one or more corresponding favorable actions on the ongoing contact interaction.

13. The method as in claim 1, wherein classifying the interaction sequence as one of either normal or non-normal further includes a classification of the interaction sequence within one or more sub-classifications of either normal or non-normal interaction sequences.

14. A tangible, non-transitory, computer-readable medium having computer-executable instructions stored thereon that, when executed by a processor on a computer, cause the computer to perform a method comprising:
   monitoring an ongoing contact interaction involving a user and at least one contact center server of a contact center;
   generating an interaction sequence according to the ongoing contact interaction with timestamp;
   classifying the interaction sequence as one of either normal or non-normal based on comparing the interaction sequence to one or more behavioral models the are trained on historical contact interaction sequences specific to the contact center; and
   performing, in response to the interaction sequence being classified as non-normal, one or more corresponding mitigation actions on the ongoing contact interaction.

15. The tangible, non-transitory, computer-readable medium as in claim 14, wherein classifying the interaction sequence as non-normal comprises:
   classifying the interaction sequence as one of either a fraudulent user interaction or an inexperienced user interaction, wherein the one or more corresponding mitigation actions correspond to whether the ongoing contact interaction is classified as a fraudulent user interaction or an inexperienced user interaction.

16. The tangible, non-transitory, computer-readable medium as in claim 14, further comprising:
   determining an inability to adequately classify the interaction sequence according to the ongoing contact interaction;
   generating an updated interaction sequence according to continued monitoring of the ongoing contact interaction;
   classifying, the updated interaction sequence as one of either normal or non-normal based on the one or more behavioral models of interaction sequences; and
   performing, in response to the updated interaction sequence being classified as non-normal, one or more corresponding mitigation actions on the ongoing contact interaction.

17. The tangible, non-transitory, computer-readable medium as in claim 14, wherein generating the interaction sequence according to the ongoing contact interaction comprises:
   generating an interaction sequence vector;
   wherein classifying the interaction sequence as one of either normal or non-normal is based on comparing the interaction sequence vector to one or more behavioral models of interaction sequence vectors.

18. The tangible, non-transitory, computer-readable medium as in claim 14, further comprising:
   clustering a plurality of individual stored interaction sequences into one of either a normal interaction sequence cluster or a non-normal interaction sequence cluster;
   wherein classifying the interaction sequence as one of either normal or non-normal is based on determining whether the interaction sequence corresponds to either the normal interaction sequence cluster or the non-normal interaction sequence cluster.

19. The tangible, non-transitory, computer-readable medium as in claim 14, further comprising:
 performing, in response to the interaction sequence being classified as normal, one or more corresponding favorable actions on the ongoing contact interaction.

20. An apparatus, comprising:
 one or more network interfaces to communicate with a computer network;
 a processor coupled to the one or more network interfaces and adapted to execute one or more processes; and
 a memory configured to store a process that is executable by the processor, the process when executed operable to perform a method comprising:
  monitoring an ongoing contact interaction involving a user and at least one contact center server of a contact center;
  generating an interaction sequence according to the ongoing contact interaction with timestamp;
  classifying the interaction sequence as one of either normal or non-normal based on comparing the interaction sequence to one or more behavioral models that are trained on historical contact interaction sequences specific to the contact center; and
  performing, in response to the interaction sequence being classified as non-normal, one or more corresponding mitigation actions on the ongoing contact interaction.

\* \* \* \* \*